US010601062B2

(12) United States Patent
Sammells

(10) Patent No.: US 10,601,062 B2
(45) Date of Patent: Mar. 24, 2020

(54) SODIUM METAL BATTERIES WITH INTERCALATING CATHODE

(71) Applicant: DYNANTIS CORP., Santa Barbara, CA (US)

(72) Inventor: Anthony F. Sammells, Santa Barbara, CA (US)

(73) Assignee: Dynantis Corp., Santa Barbara, CA (US)

(*) Notice: Subject to any disclaimer, the term of this patent is extended or adjusted under 35 U.S.C. 154(b) by 0 days.

(21) Appl. No.: 14/872,622

(22) Filed: Oct. 1, 2015

(65) Prior Publication Data

US 2017/0098848 A1   Apr. 6, 2017

(51) Int. Cl.
*H01M 8/18*   (2006.01)
*H01M 4/58*   (2010.01)
(Continued)

(52) U.S. Cl.
CPC ......... *H01M 8/188* (2013.01); *H01M 2/1088* (2013.01); *H01M 4/131* (2013.01);
(Continued)

(58) Field of Classification Search
CPC ........ H01M 8/188; H01M 8/20; H01M 4/131; H01M 4/134; H01M 10/44;
(Continued)

(56) References Cited

U.S. PATENT DOCUMENTS 2,683,669 A * 7/1954 Coler ................. H01B 1/24
252/511
3,404,035 A * 10/1968 Weber ................. C04B 35/111
429/104
(Continued)

FOREIGN PATENT DOCUMENTS

CN         103771892    * 5/2014   ............. C04B 35/76
WO   WO 2006/105253      10/2006
WO   WO 2016/089902 A1    6/2016

OTHER PUBLICATIONS

Billaud et al. (Nov. 14, 2014) "β-NaMnO2: A High-Performance Cathode for Sodium-Ion Batteries," J. Am. Chem. Soc. 136(49):17243-17248.

(Continued)

*Primary Examiner* — Cynthia H Kelly
*Assistant Examiner* — Aaron J Greso
(74) *Attorney, Agent, or Firm* — Leydig, Voit & Mayer, Ltd.

(57) ABSTRACT

Cell and batteries containing them employing a cathode having a intercalating metal oxide in combination with a sodium metal haloaluminate. At operating temperatures, the positive electrode (cathode) of the invention comprises electroactive cathode material permeated with and in physical and electrical contact with the sodium metal haloaluminate catholyte. The positive and negative electrodes are separated with a solid alkali metal conducting electrolyte. The intercalating metal oxice is not in direct physical contact with the solid electrolyte. Electric and ionic conductivity between the solid electrolyte and the positive electrode is mediated by the sodium haloaluminate catholyte. Batteries of the invention are useful for bulk energy storage, particularly for electric utility grid storage, as well as for electric vehicle propulsion.

24 Claims, 9 Drawing Sheets

(51) Int. Cl.

| | | |
|---|---|---|
| *H01M 10/39* | (2006.01) | |
| *H01M 4/52* | (2010.01) | |
| *H01M 4/134* | (2010.01) | |
| *H01M 10/0563* | (2010.01) | |
| *H01M 10/44* | (2006.01) | |
| *H01M 4/50* | (2010.01) | |
| *H01M 4/485* | (2010.01) | |
| *H01M 2/10* | (2006.01) | |
| *H01M 4/131* | (2010.01) | |
| *H01M 8/20* | (2006.01) | |
| *H02J 7/00* | (2006.01) | |

(52) U.S. Cl.
CPC ........... *H01M 4/134* (2013.01); *H01M 4/485* (2013.01); *H01M 4/502* (2013.01); *H01M 4/523* (2013.01); *H01M 4/5825* (2013.01); *H01M 8/20* (2013.01); *H01M 10/0563* (2013.01); *H01M 10/399* (2013.01); *H01M 10/44* (2013.01); *H02J 7/0052* (2013.01); *H02J 7/0063* (2013.01); *H01M 2300/0048* (2013.01); *H01M 2300/0057* (2013.01)

(58) Field of Classification Search
CPC ..... H01M 10/0563; H01M 2300/0048; H01M 4/485; H01M 4/502; H01M 4/523; H01M 4/5825; H01M 10/399; H01M 2300/0057; H01M 2/1088; H02J 7/0052; H01J 7/0563

See application file for complete search history.

(56) References Cited

U.S. PATENT DOCUMENTS

| | | | |
|---|---|---|---|
| 3,413,150 A | 11/1968 | Kummer et al. | |
| 3,877,984 A | 4/1975 | Werth | |
| 3,969,138 A * | 7/1976 | Werth ............... | H01M 10/3909 429/103 |
| 3,988,163 A | 10/1976 | Sklarchuk | |
| 4,366,215 A * | 12/1982 | Coetzer ................... | H01M 4/36 205/57 |
| 4,452,777 A | 6/1984 | Abraham et al. | |
| 4,529,676 A | 7/1985 | Galloway et al. | |
| 4,664,849 A | 5/1987 | Farrington et al. | |
| 4,749,634 A | 6/1988 | Sammells | |
| 4,973,534 A | 11/1990 | Adendorff et al. | |
| 4,975,343 A | 12/1990 | Coetzer | |
| 5,340,668 A | 8/1994 | Redey et al. | |
| 5,462,818 A | 10/1995 | Plichta et al. | |
| 5,476,733 A | 12/1995 | Coetzer et al. | |
| 5,558,961 A | 9/1996 | Doeff et al. | |
| 5,817,434 A | 10/1998 | Brooker et al. | |
| 6,007,943 A | 12/1999 | Coetzer | |
| 6,187,479 B1 | 2/2001 | Liu | |
| 8,343,661 B2 | 1/2013 | Galloway et al. | |
| 8,435,673 B2 | 5/2013 | Lemmon et al. | |
| 8,445,134 B2 | 5/2013 | Young | |
| 8,580,438 B2 | 11/2013 | Farmer et al. | |
| 8,835,041 B2 | 9/2014 | Johnson et al. | |
| 8,962,191 B2 | 2/2015 | Vallance et al. | |
| 8,980,459 B1 | 3/2015 | Sammells | |
| 2010/0279175 A1 | 11/2010 | Young | |
| 2014/0065456 A1* | 3/2014 | Bhavaraju ............ | H01M 10/36 429/81 |
| 2014/0072872 A1 | 3/2014 | Hodgkinson et al. | |
| 2014/0199577 A1* | 7/2014 | Bhavaraju .............. | C25B 13/04 429/104 |
| 2014/0212707 A1 | 7/2014 | Bhavaraju et al. | |
| 2015/0093644 A1 | 4/2015 | Han et al. | |
| 2015/0111097 A1 | 4/2015 | Park et al. | |
| 2015/0147619 A1 | 5/2015 | Chae et al. | |
| 2015/0171419 A1* | 6/2015 | Shevchenko ......... | H01M 4/366 429/156 |

OTHER PUBLICATIONS

Bucher et al. (Mar. 13, 2013) "Combustion-synthesized sodium manganese (cobalt) oxides as cathodes for sodium ion batteries," J. Solid State Electrochem. 17(7):1923-1929.

Caballero et al. (2002) "Synthesis and characterization of high-temperature hexagonal P2-$Na_{0.6}$MnO and its electrochemical behaviour as cathode in sodium cells," J. Mat. Chem. 12:1142-1147.

Datta et al. (Oct. 2014) "Electrochemical properties of a new nanocrystalline NaMn2O4 cathode for rechargeable sodium ion batteries," Materials Science and Engineering B. 188:1-7.

Ellis et al. (Aug. 2012) "Sodium and sodium-ion energy storage batteries," Current Opinion in Solid State Materials Science. 16:168-177.

Hasegawa et al. (2005) "Effect of the lattice volume on the $Al^{3+}$ ion conduction in NASICON type solid electrolyte," Solid State Ionics. 176:2499-2503.

Hoshina et al. (2005) "Investigation on Electrochemical Interface between $Li_4Ti_5O_{12}$ and $Li_{1+x}Al_xTi_{2-x}(PO_4)_3$ NASICON-Type Solid Electrolyte," J. Electrochem. Soc. 152:A2138-A2142.

Jain et al. (2006) "Structural Studies of Lithium Intercalation in a Nanocrystalline $\alpha$-$Fe_2O_3$ Compound," Chem. Mater. 18(2):423-424.

Kanzaki et al. (2005) "Nano-sized $\gamma$-$Fe_2O_3$ as lithium battery cathode," J. Power Sources. 146:323-326.

Kennedy et al. (1973) Preparation of Highly Conductive Beta-Alumina and Electrochemical Measurements. In; *Fast Ion Transport in Solids: Solid-State Batteries and Devices*. Elsevier Science Publishing Co. Inc. pp. 563-572.

Kennedy et al. (1974) "Galvanic Cells Containing Cathodes of Iron-Doped Beta-Alumina," J. Electrochemical Society. 121(1):1-7.

Kitaura et al. (2007) "Preparation of $\alpha$-$Fe_2O_3$ Electrode Materials via Solution Process and Their Electrochemical Properties in All-Solid-State Lithium Batteries," J. Electrochemical Society. 154(7):A725-A729.

Kobayashi et al. (Jul. 2010) "Electrochemical properties of Li symmetric solid-state cell with NASICON-type solid electrolyte and electrodes," Electrochem. Commun. 12:894-896.

Komaba et al. (2002) "Synthesis of Nanocrystalline $Fe_2O_3$ for Lithium Secondary Battery Cathode," Electrochemistry. 70:506-510.

Kwon et al. (2004) "Inorganic Nanocrystalline and Hybrid Nanocrystalline Particles (Gamma-$Fe_2O_3$/PPY) and Their Contribution to Electrode Materials for Lithium Batteries," J. Electrochemical Society. 151(9):A1445-A1449.

Lee (Summer 2013) "Beyond Convention Cathode Materials for Li-ion Batteries and Na-ion Batteries: Nickel fluoride Conversion Materials and P2 type Na-ion intercalation cathodes," Dissertation submitted in partial satisfaction of the requirements for the degree of Doctor of Philosophy. University of California, San Diego.

Lee et al. (Jul. 20, 2011) "Topochemical Synthesis of Sodium Metal Phosphate Olivines for Sodium-Ion Batteries," Chem. Mater. 23:3593-3600.

Ling et al. (Jun. 28, 2013) "Phase Stability of Post-spinel Compound $AMn_2O_4$ (A=Li, Na, or Mg) and Its Application as a Rechargeable Battery Cathode," Chem. Mater. 25:3062-3071.

Ma et al. (Nov. 1, 2011) "Electrochemical Properties of Monoclinic $NaMnO_2$," J. Electrochemical Society. 158:A1137-A1312.

Mathew et al. (Oct. 17, 2014) "Amorphous iron phosphate: potential host for various charge carrier ions," NPG Asia Material. 6:e138. pp. 1-10.

Narasimhan et al. (2002) "Synthesis of gamma ferric oxide by direct thermal decomposition of ferrous carbonate," Materials Letters. 52(4-5):295-300.

Nitta et al. (Apr. 2013) "Development of Molten Salt Electrolyte Battery," SEI Technical Review. 76:33-39.

Ohzuku et al. (1993) "Comparative study of $LiCoO_2$, $LiNi_{1/2}Co_{1/2}O_2$ and $LiNiO_2$ for 4 volt secondary lithium cells," Electrochimica Acta. 38:1159-1167.

Ohzuku et al. (2001) "Layered Lithium Insertion Material of $LiNi_{1/2}Mn_{1/2}O_2$ : A Possible Alternative to $LiCoO_2$ for Advanced Lithium-Ion Batteries," Chem. Lett. 30(8):744-745.

(56) References Cited

OTHER PUBLICATIONS

Ozawa et al. (1994) "Lithium-ion rechargeable batteries with $LiCoO_2$ and carbon electrodes: the $LiCoO_2$/C system," Solid State Ionics. 69:212-221.

Padhi et al. (1997) "Effect of Structure on the $Fe^{3+/Fe2+}$ Redox Couple in Iron Phosphates," J. Electrochem. Soc. 144:1609-1613.

Patoux et al. (2003) "Structural and Electrochemical Studies of Rhombohedral $Na_2TiM(PO_4)_3$ and $Li_{1.6}Na_{0.4}TiM(PO_4)_3$ (M=Fe, Cr) Phosphates," Chem. Mater. 3:2084-2093.

Quintin et al. (2006) "Study of the lithium insertion—deinsertion mechanism in nanocrystalline $\gamma$-$Fe_2O_3$ electrodes by means of electrochemical impedance spectroscopy," Electrochimica Acta. 51(28):6426-6434.

Sauvage et al. (2007) "Study of the Insertion/Deinsertion Mechanism of Sodium into $Na_{0.44}MnO_2$," Inorganic Chemistry. 46:3289-3294.

Slater et al. (May 21, 2012) "Sodium-Ion Batteries," Adv. Funct. Mater. 23:947-958.

Sun et al. (2011) "Structural Studies on $NaFePO4$ as a Cathode Material for $Na^+/Li^+$ Mixed-Ion Batteries," Electrochemical Society Transactions. 35(32):3-7.

Tillement et al. (1992) "Electrochemical studies of mixed valence NASICON," Solid State Ionics. 56:391.

Uebou et al. (2002) "Electrochemical Sodium Insertion into the 3D-framework of $Na_3M_2(PO_4)_3$ (M=Fe, V)," The Rep. Inst. Adv. Mater. Study. A Kyushu University Publication. 16:1-5.

Xu et al. (2003) "A Nanocrystalline Ferric Oxide Cathode for Rechargeable Lithium Batteries," Electrochem. Solid-State Lett. 9:A190-A193.

Yazami et al. (1995) "High performance $LiCoO_2$ positive electrode material," J. Power Sources. 54:389-392.

International Search Report and Written Opinion, International Application No. PCT/US2016/055146, dated Dec. 15, 2016, 7 pages.

Xu et al. (Mar. 14, 2013) "Recent advances in sodium intercalation positive electrode materials for sodium ion batteries," Funct. Mater. Lett. 6(1):1330001. pp. 1-7, with enlarged copies of Figures 3C and 4C.

Koo, B. et al. (Jan. 2013) "Intercalation of Sodium Ions into Hollow Iron Oxide Nanoparticles," Chemistry of Materials 25(2): 245-252.

Saravanan, K. et al. (Nov. 2012) "The First Report on Excellent Cycling Stability and Superior Rate Capability of Na 3 V 2 (PO 4) 3 for Sodium Ion Batteries," Advanced Energy Materials 3(4): 444-450.

Komaba, S. et al. (Nov. 2009) "Electrochemical Insertion of Li and Na Ions into Nanocrystalline Fe [sub 3]0[sub 4] and [alpha]-Fe [sub 2]0[sub 3] for Rechargeable Batteries," Journal of the Electrochemical Society 157(1): A60.

Lu, X. et al. (Aug. 2014) "Liquid-metal electrode to enable ultra-low temperature sodium-beta alumina batteries for renewable energy storage," Nature Communications 5(1):1-8.

Zaghib, K. et al. (Jun. 2011) "Characterization of Na-based phosphate as electrode materials for electrochemical cells," Journal of Power Sources, Elsevier SA, CH 196(22): 9612-9617.

Supplementary European Search Report for EP application 16 852 818.0 corresponding to PCT/US2016/055146 dated Apr. 17, 2019.

\* cited by examiner

US 10,601,062 B2

SODIUM METAL BATTERIES WITH INTERCALATING CATHODE

BACKGROUND OF THE INVENTION

There is a significant need in the art for improved secondary (rechargeable) batteries having high energy density, decreased cost, improved safety, reduced thermal management and improved stability of component supply. Batteries having such improved characteristics will be useful in a variety of applications and are of particular interest for electric utility grid storage.

Electric utilities are seeking more cost effective and efficient strategies to manage energy delivery to the grid. Peak demand is frequently met by the use of relatively expensive gas turbines, which at times of low demand remain idle. Ideally, base load electrical energy production could be operated at optimum peak efficiency, with demand variations being either absorbed or delivered using some form of energy storage. Pumped hydro (PH) technology, where water is reversibly pumped from a lower to higher elevation, has been employed for such energy storage, where round-trip efficiency is typically 68%. However, acceptable sites for implementation of PH energy storage, based upon location and environmental concerns, are now very limited. An alternatively is the use of large storage batteries, where round-trip energy conversion efficiencies can exceed that of PH, and wherein siting is not limited by geography. The market for storage batteries for this application is expected to grow, provided that battery costs are reduced and performance is increased. Major issues that are currently limiting implementation of advanced battery systems for grid storage include: overall cost for materials and associated hardware, long-term availability of materials, safety, achieving long cycle life and thermal management during operation. The present invention provides an improved battery to meet these requirements. The batteries of the invention incorporate no toxic materials, and are generally safer than comparable battery systems (e.g., sodium-sulfur systems).

Improved secondary batteries will also provide particular benefit for applications to electric vehicles and their use will translate into greater range for such vehicles.

U.S. Pat. No. 3,988,163 relates to a secondary battery having a molten sodium negative reactant, a sulfur and mixture of metal halides positive reactant melt, a carbon powder dispersed within the positive reactant melt, a solid member separating the negative reactant and the positive reactant, and a molten electrolyte on the positive reactant side of the solid member which is said to comprise a molten sodium haloaluminate. The solid member is said to be selectively-ionically conductive to sodium cations. The positive reactant is said to comprise molten sulfur and a molten mixture of metal halides. The metal halides are required to be "soluble to some extent in the sodium haloaluminate electrolyte of the battery". Molten sodium haloaluminate is defined as "materials which include sodium halides, as for example, chlorides, bromides, fluorides, or iodides or sodium, and aluminum halides, for example, chlorides, bromides, fluorides or iodides of aluminum." Preferred metal halides are said to be aluminum chloride and antimony chloride. The positive reactant compartment of the battery is described as containing "electrolyte-sulfur mixture of metal halides positive reactant melt" and, more specifically as "sodium chloroaluminate-sulfur, aluminum chloride and antimony chloride melt." The battery is reported to operate at temperatures ranging from 150 to 225° C.

U.S. Pat. No. 3,877,984 relates to a secondary battery having a molten alkali metal negative reactant, a metal chloride positive reactant, a molten alkali metal chloraluminate electrolyte and a selectively-ionically-conductive separator positioned between the negative and the positive reactants. Metal chloride, sodium chloride and aluminum trichloride are combined in the positive reactant chamber and heated to form a melt. Exemplified metal chloride positive reactants included antimony chloride, ferric chloride and cupric chloride. The battery is reported to operate at temperatures ranging from 180 to 200° C.

U.S. Pat. No. 4,452,777 relates to an electrochemical cell having a sodium anode assembly, an alkali metal aluminum tetrahalide electrolyte where the cathode material is a transition metal chalcogenide or a reaction product of the chalcogenide with the electrolyte. The cathode material is described as being dispersed on a substrate which is inert under cell operating conditions. Exemplary substrates are carbon felt and nickel mesh. The preferred transition metal chalcogenide is reported to be $VS_2$. Exemplary cells are reported to be operated at 165° C. or 170° C.

U.S. Pat. No. 5,476,733 reports a high temperature (200-400° C.) rechargeable electrochemical power storage cell where the anode compartment contains sodium active anode material, and the cathode compartment contains a sodium aluminum chloride molten salt electrolyte and a solid cathode comprising an electrolyte permeable porous matrix impregnated with the molten salt electrolyte which has solid active cathode material dispersed therein. The cell is operated at a temperature where sodium and the molten salt electrolyte are molten. The electrolyte is described as "a substantially equimolar mixture of sodium chloride and aluminium chloride in which the proportion of aluminium chloride in all states of charge is at most 50% on a molar basis." The active cathode material is described as comprising at least one transition metal selected from the group consisting of Fe, Ni, Cr, Co, Mn, Cu and Mo having, dispersed therein, at least one additive element. In the description and the examples, the at least one additive element is said to be selected from the group consisting of As and Sb where the atomic ratio of transition metal to additive element in the active cathode material being 90:1-30:70. Only in the Abstract is the additive element said to be selected from the group consisting of As, Bi, Sb, Se and Te. The cathode is further described as "may contain, in addition, 2-12% by mass, based on the charged active cathode material, of sodium fluoride dopant and/or a sulfur-containing dopant whose sulfur forms 0.3-5% of the charged active cathode material by mass."

U.S. Pat. No. 5,462,818 relates to an electrochemical cell where the cathode is graphite immersed in molten $NaAlCl_4$, the anode is liquid sodium and β alumina is the sodium ion conducting solid electrolyte separating the anode and cathode compartments. The cathode is reported to contain 20 wt % graphite.

U.S. Pat. No. 8,343,661 reports a rechargeable electrochemical cell having a cathode composition comprising certain transition metals, alkali halometallate, alkali halide, a source of Zn and a source of chalcogenide. The source of Zn and that of chalcogenide is reported may be effective to improve the extractive capacity of the cell and to decrease cell resistance. Operating temperatures for the cell are reported to range from 200 to 500° C.

U.S. Pat. No. 8,445,134 relates to an electrochemical cell for a secondary battery including a positive electrode having an intercalation cathode material of bentonite. The bentonite is described as treated with acid or treated to form a polyanilie-intercalated bentonite. The cell contains an anode material containing one of magnesium and sodium and an electrolyte between the positive electrode and the negative electrode. When the anode material contains sodium, the electrolyte is a salt electrolyte, and both the anode material and the electrolyte are molten at the operating temperature of the battery.

U.S. Pat. No. 8,980,459 relates to cells and batteries employing a transition metal chalogenide positive electrode in combination with a liquid alkali metal haloaluminate electrolyte. Cells having an alkali metal negative electrode in combination with the positive electrode are reported.

Bucher et al. (2013) J. Solid State Chem. 17(7) 1923-1929 reports the use of certain sodium manganese oxides and sodium manganese cobalt oxides as cathodes for sodium ion batteries. Comprise a film containing the oxide and an organic binder on aluminum foil. The anodes employed are sodium metal and the electrolyte is a solution of $NaAlCl_4$ (1M) in organic solvent (propylene carbonate). Caballero et al. (2002) J. Mat. Chem. 12:1142-1147 reports the use of $Na_{0.6}MnO_2$ as cathodes in similar sodium ion cells.

U.S. published patent applications US2015/0093644 (published Apr. 2, 2015) and US2015/0111097 (published Apr. 23, 2015) relate to certain composite transition metal oxides which contain sodium which are reported to be useful as positive electrode material in sodium batteries. A positive electrode film formed from a mixture of the composite oxide with a conductor, a binder and a solvent is reported. Cells reported are described as having an organic electrolyte. The '644 application reports a composite oxide of formula:

$$Na_xMa_yMn_zMb_vO_{2+d}$$

wherein, $0.2 \leq x \leq 1$, $0 < y \leq 0.2$, $0 < z \leq 1$, $0 \leq v < 1$, $0 < z+v \leq 1$, $-0.3 \leq d < 1$, Ma is an electrochemically inactive metal, and Mb is different from Ma and Mn, and is at least one transition metal selected from elements in Groups 4 to 12 of the periodic table of the elements. The '097 application reports a composite oxide including sodium and a first and second transition metal having certain first and second diffraction peaks with a ratio of the first and second diffraction peaks of about 7 or greater.

U.S. published patent application US 2015/0147619 (published May 28, 2105) relates to a molten sodium battery having certain molten salt electrolytes that melt at temperatures between 100-200° C.

While electrochemical cells employing a molten sodium metal anode, a molten electrolyte and electroactive cathode materials have been reported, there remains a significant need in the art for electrochemical cells, particularly those that are rechargeable, which exhibit properties useful in a given application, such as useful levels of charge capacity and useful levels of energy density, which can be operated at practically useful temperatures, and which have enhanced safety and decreased cost. The present invention provides such electrochemical cells.

SUMMARY OF THE INVENTION

This invention relates to cells and batteries employing a positive electrode (cathode) containing a combination of certain sodium intercalating layered metal oxides with a molten sodium haloaluminate, particularly a sodium chloroaluminate, e.g., $NaAlCl_4$, and particularly to those cells and batteries in which the cathode is combined with a molten sodium negative electrode (anode). Batteries of the invention are useful for bulk energy storage, particularly for electric utility grid storage, as well as for electric vehicle propulsion. At operating temperatures, the positive electrode (cathode) of the invention is a solid comprising the sodium intercalating metal oxide as the electroactive cathode material permeated with and in physical and electrical contact with molten sodium haloaluminate. The sodium haloaluminate functions as the catholyte (or secondary electrolyte) in the cell and battery.

In an embodiment, the invention provides an electrochemically reversible positive electrode and storage cells containing the positive electrode. In a specific embodiment, the catholyte permeated positive electrode material is retained within a metal mesh. In specific embodiments, the invention relates to storage cells having a molten sodium negative electrode in combination with the reversible positive electrode.

In specific embodiments, the positive electrode further comprises a dispersed electronically conductive material, for example carbon particles. In specific embodiments, when the dispersed conductive material is carbon particles, the amount of carbon particles present in the positive electrode is 5 wt % or less of total cathode materials (catholyte, electroactive materials and any dispersed electronically conductive material). In specific embodiments, when the dispersed electronically conductive material is carbon particles, the amount of carbon particles present in the positive electrode is 1 wt % or less of total cathode material. In specific embodiments, when the dispersed conductive material is carbon particles, the amount of carbon particles present in the positive electrode is 0.5 wt % or less of total cathode material. When the dispersed conductive material is other than carbon, the amount of the dispersed conductive material present is 25 wt % or less of total cathode material. In specific embodiments, the amount of non-carbon conductive material is 10 wt % or less of total cathode material. In specific embodiments, the non-carbon dispersed is present in the positive electrode at 5 wt % or less of total cathode materials. In specific embodiments, the no-carbon dispersed conductive material is carbon is present in the positive electrode at 1 wt % or less of total cathode material. Electronically conducting materials include electronically conducting refractory materials, exemplified by SiC, $Ti_3SiC_2$, WC, $Nb_{0.1}Ti_{0.9}O_2$, TaC, $TaC_{0.75}$ and $TaC_{0.5}$.

The positive and negative electrodes of the cell are separated by a dense (non-porous) sodium cation-conducting solid electrolyte (also termed a separator). More specifically, the sodium-conducting material is a β-alumina (beta alumina). More specifically, the sodium cation-conducting material is a β″-alumina (beta double prime alumina). In specific embodiments, a cell of this invention includes a solid electrolyte (e.g., beta-alumina or beta double prime alumina) element (in the form of a sheet, layer or tube) having a thickness ranging from 0.5 to 3 mm, or more preferably having a thickness of 0.5 to 1.5 mm. In specific embodiments, the solid electrolyte of the invention is in the form of a receptacle, such as a tube, to retain liquid catholyte and the positive electrode.

Sodium intercalating metal oxides useful in the cathodes of this invention include:
1. $Na_xMO_2$ layered compounds where:
$0.25 < x \leq 0.7$ and M is at least one of Fe, Co, Mn, Ni, Cu. More preferably M is Mn, Co or a combination of Mn and Co. In specific embodiments, the intercalating metal oxide is $Na_{0.44}MnO_2$, $Na_{0.7}MnO_2$, $Na_{0.67}CoO_2$, $Na_xCo_yMn_zO_2$, where x is as defied above and y+z is 1 and $0 \leq y < 1$, and preferably $0 \leq y < 0.5$. In an embodiment, $0.1 \leq y \leq 0.2$.
2. The iron oxides $\gamma$-$Fe_2O_3$ or $\alpha$-$Fe_2O_3$.

3. $Na_2O.5M_xAl_2O_3$ where $0<x\leq0.5$ and M is at least one of Fe, Co, Mn, Ni or Cu, more preferably M is Fe, Co or Mn and more preferably $0.1\leq x\leq0.5$ In an embodiment, $0.2\leq x\leq0.5$.
4. Transition metal substituted NASICON based materials: $Na_3M_2(XO_4)_3$, where X is P, Si, S, Mo or As; and M is at least one transition metal, for example Fe, Ti, V, Nb, or Cr.
5. $NaMPO_4$, where M is at least one of Mn, Fe, Co or Ni and in an embodiment wherein the material has an olivine structure.
6. $NaMnO_2$, either $\alpha$-$NaMnO_2$ or $\beta$-$NaMnO_2$.
7 $LiMnO_2$, $LiMn_2O_4$ or $LiFePO_4$ (olivine).

The amount of solid intercalating metal oxide combined with the molten catholyte is such that once the cathode is formed, the solid metal oxide is at least completely wetted with the catholyte. In specific embodiments, the solid metal oxide is present in the cathode in an amount ranging from 4 w %-60 wt % of total cathode materials (catholyte, electroactive material and any dispersed conductive material.) In an embodiment, the amount of solid metal oxide in the cathode ranges from 5 wt % to 50 wt % of total cathode materials. In an embodiment, the amount of solid metal oxide in the cathode ranges from 4 wt % to 20 wt % of total cathode materials. In an embodiment, the amount of solid metal oxide in the cathode ranges from 5 wt % to 20 wt % of total cathode materials.

The intercalating metal oxide of the positive electrode is not in direct physical contact with the dense sodium-conductive solid electrolyte, and is not in direct physical contact with the sodium of the negative electrode. The matrix of the positive electrode is, however, in electrical/ionic contact with the solid electrolyte via the molten metal salt catholyte.

In an embodiment, the positive electrode is a solid matrix containing electroactive material which is permeated with molten sodium haloaluminate catholyte. Sodium ions mediated through the dense sodium ion-conducting electrolyte enter the solid matrix of the positive electrode via the molten sodium salt catholyte. The catholyte-permeated matrix of the positive electrode receives, on cell discharge, sodium cations from the negative electrode through the solid electrolyte and liquid (molten) catholyte which are intercalated into the electroactive solid. Discharge products are retained within the catholyte-permeated matrix and released on charging. In specific embodiments, the cell is rechargeable. In specific embodiments, the liquid electrolyte of the cell is $NaAlCl_4$.

In specific embodiments, the cell of this invention is operated at a temperature at which the sodium haloaluminate electrolyte is molten (liquid). Typically, the sodium metal of the negative electrode is also molten at this operating temperature. In a specific embodiment, the cell is operated at a temperature between about 150 to 350° C. In another embodiment, the cell is operated at a temperature between about 150 to 320° C. Yet more specifically, the cell is operated at a temperature between 250 to 300° C. In another embodiment, the cell is operated at 275 C±10%.

The invention provides a battery comprising one or more storage cells of this invention. In such a battery the storage cells are electrically connected in series, in parallel or both, as is known in the art.

The invention also provides a method for producing a storage cell comprising:
forming a negative electrode comprising molten sodium metal;
forming a cathode of sodium intercalating metal oxide permeated with a molten metal salt catholyte; and
positioning a dense, sodium cation-conductive solid electrolyte between the negative electrode and the molten catholyte.

In a specific embodiment, the electrolyte permeated solid of the positive electrode is formed within a conductive holder, for example, a conductive mesh holder, particularly a metal mesh holder. This embodiment provides particular benefit for safety because it minimizes the risk of violent reaction between positive electroactive materials and molten sodium.

In a specific embodiment, the sodium intercalating metal oxide of the cathode is formed into a porous matrix that in the cell is permeated by the molten sodium haloaluminate catholyte.

In a more specific embodiment, the dense layer of the alkali metal-ion conductive mixed metal oxide is in the form of a one-end closed tube for receiving liquid sodium salt catholyte in contact with the sodium intercalating metal oxide matrix of the positive electrode.

The invention further provides a method for generating energy, comprising discharging one or more cells of the invention. The invention further provides a method for generating energy which comprises forming one or more cell of this invention and discharging the one or more cells. In specific embodiments, the cells of the invention are rechargeable and the methods for generating energy further comprise a step of storing electrical energy which comprises recharging the one or more cells after discharge.

The invention further provides a battery for use in electric utility grid storage which comprises one or more cells of this invention.

The invention further provides a battery for use in an electric vehicle which comprises one or more cells of this invention.

In embodiments, the invention provides a storage cell comprising:
a negative electrode comprising molten sodium metal;
a positive electrode having a solid sodium intercalating metal oxide permeated with molten sodium haloaluminate catholyte; and
a solid sodium-conducting separation element intermediate between the negative electrode and the molten sodium haloaluminate catholyte; wherein the molten haloaluminate catholyte permeates the matrix of positive electrode and the electroactive material of the positive electrode is not in direct physical contact with the solid sodium ion-conducting separation element. In an embodiment, the matrix of the positive electrode is retained in the cathode compartment of the cell in a conductive container or receptacle. In an embodiment the catholyte is $NaAlCl_4$.

In embodiments, the battery comprises a plurality of cells of the embodiments of the preceding paragraphs.

In embodiments, the invention provides a method for producing a storage cell comprising:
forming a negative electrode comprising molten sodium metal;
forming a positive electrode comprising a sodium intercalation metal oxide permeated with a molten sodium haloaluminate catholyte;
positioning a dense, sodium cation-conductive solid electrolyte between the negative electrode and the positive electrode; and
providing a molten sodium haloaluminate catholyte in physical and electrical contact between the sodium ion-conductive solid electrolyte and the matrix of the positive electrode. In embodiments, the matrix of the positive electrode is formed by combining sodium haloaluminate with the sodium intercalating metal oxide and heating the mixture to melt the sodium haloaluminate. In an embodiment, the sodium haloaluminate is NaAlCl$_4$. In an embodiment, the matrix is formed within a conductive container. In an embodiment, the matrix is formed having an embedded current collector.

The invention also provides a method for generating energy, comprising forming one or more cells of any embodiments herein and discharging the one or more cells. In an embodiment, the method further comprises a step of storing electrical energy wherein the one or more cells are rechargeable and wherein after discharge the one or more cells are recharged by application of a voltage to the cell.

Other aspects and embodiments of the invention will be apparent on review of the detailed description and the figures herein.

DESCRIPTION OF THE INVENTION

Figure 1:
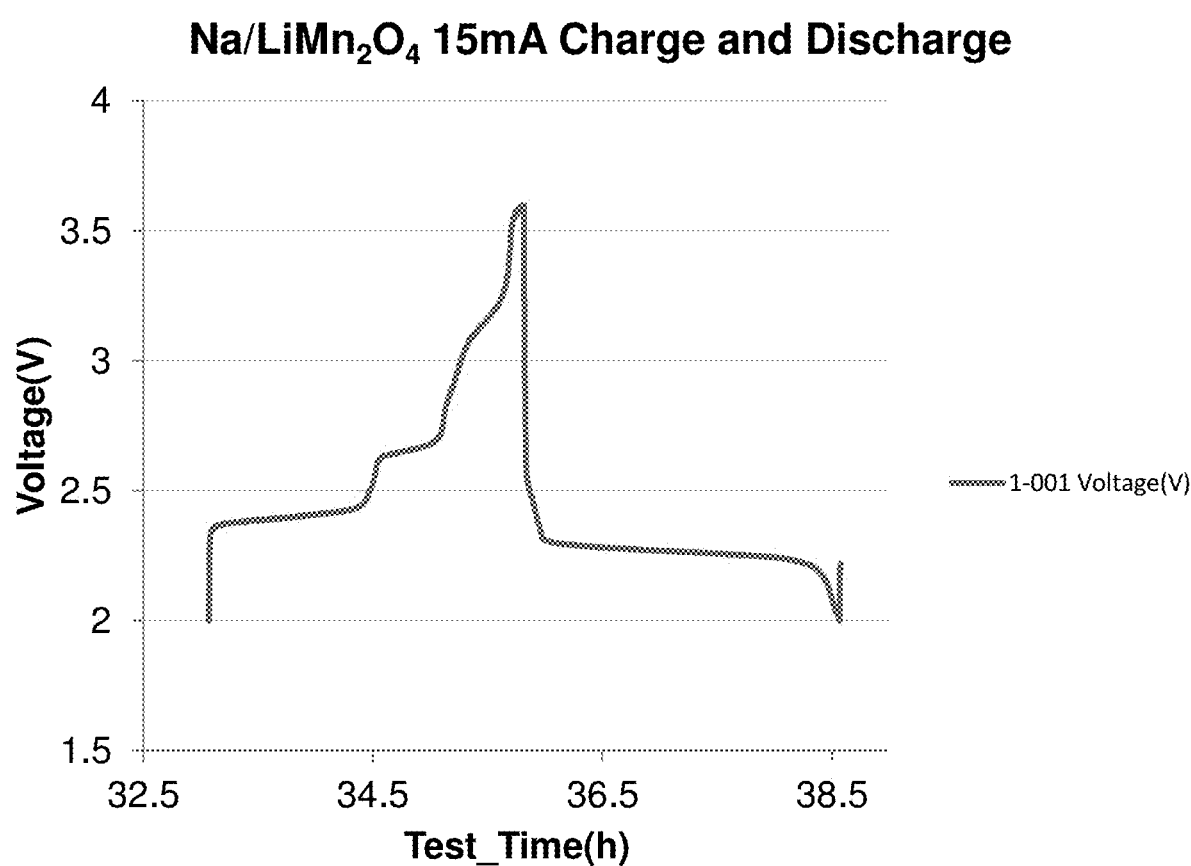
FIG. 1 is a graph of voltage vs. time illustrating GCPL (Galvanostatic Cycling with Potential Limitation) performed on an Arbin SCTS at a rate of 15 mA and cycled between 2 and 3.6 V for a cell of Example 1 where the cathode contained LiMn$_2$O$_4$.

The present invention is based at least in part on use of sodium ion intercalation metal oxide as a positive electrode permeated with an alkali metal haloaluminate catholyte which is molten at cell operating temperatures and its combination with a molten sodium metal negative electrode. In a cell, the positive and negative electrodes are separated by a sodium conductive solid electrolyte in physical and electrical contact with the sodium metal of the negative electrode and with a reservoir of the molten catholyte.

The use of sodium intercalation metal oxides in the cathode facilitates maximizing capacity and minimizing volumetric shape change for cathode electroactive materials. This provides enhanced cell lifetimes and the opportunity to use inexpensive materials.

In an embodiment, the positive electroactive materials of the positive electrode comprising the sodium intercalation metal oxide are formed into a matrix which is permeated with the catholyte. In a specific embodiment, a conductive material, such as carbon, is dispersed in the matrix. In a specific embodiment, the positive electrode matrix is formed by homogenously combining the intercalating metal oxide, carbon or other conductive material and sodium haloaluminate and thereafter raising the temperature of the combined materials above the melting temperature of the alkali metal haloaluminate forming a solid matrix permeated with molten catholyte. It will be appreciated that the matrix of the positive electrode can also be prepared by mixing appropriate intercalating metal oxides with metal halides and aluminium halides in the appropriate stoichiometry to achieve the desired components of the matrix followed by heating of the mixture to liquefy catholyte. It is currently believed that employing such methods, pores are formed within the electroactive material as the catholyte is liquefied.

In a specific embodiment, the combined intercalating metal oxide, (optional) dispersed electronically conductive material and catholyte are introduced into an electronically conductive container or receptacle prior to melting the catholyte. This container or receptacle retains the electropositive materials and allows electrolyte to be in physical and electrically connection with the matrix, but avoids or minimizes physical contact of electropositive materials with the solid electrolyte (separator). In a specific embodiment the container or receptacle is a metal mesh. Alternatively or in combination, the combined materials are formed into a desired shape prior to melting the electrolyte. Alternatively or in combination, a current collector is embedded within the matrix prior to heating the materials.

The components of the positive or negative electrode involved in the electrochemistry of discharge and charging of the cell are termed electroactive.

The positive electrode contains or is in contact with molten sodium haloaluminate and species therein may react with transition metal of the intercalating metal oxide to generate chemical reaction products. It will be appreciated that additional electrochemical reactions may occur between the transition metal chalcogenide components and components of the catholyte (e.g., aluminium halide, alkali metal halide) or with any chemical reaction products in the system. Any such additional electrochemical reactions are currently believed to at most make a minor contribution to the electrochemistry of the system.

Sodium intercalation metal oxides of the invention include those as follows:

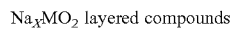

where:
0.25≤x≤0.7 and M is at least one of Fe, Co, Mn, Ni, Cu. More preferably M is Mn, Co or a combination of Mn and Co. In embodiments, 0.4≤x≤0.7. In specific embodiments, the intercalating metal oxide is Na$_{0.44}$MnO$_2$, Na$_{0.7}$MnO$_2$, Na$_{0.67}$CoO$_2$, Na$_x$Co$_y$Mn$_z$O$_2$, where x is as defied above and y+z is 1 and 0≤y<1, and preferably 0≤y<0.5. In embodiments, 0.1≤y≤0.2.

Iron oxides γ-Fe$_2$O$_3$ or α-Fe$_2$O$_3$. These iron oxides have been reported to intercalate Li$^+$. See: Komba et al. (2002) Electrochemistry, 70:506; Xu J. J. et al. (2003) Electrochem. Solid-State Lett, (9):A190-193; Kwon et al. (2004) J. Electrochemical Society, 151 (9):A1445-A1447; Kanzahi et al. (2005) J. Power Sources, 146:323; Quinly et al. (2006) Electrochimica Acta, 51(28):6426-6434; Jain et al. (2006) Chem. Mat., 18(2):423-424; and Kitaura et al. (2007) J. Electrochemical Society, 154(7): A725-A729.

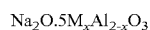

where:
0<x<0.5 and M is at least one of Fe, Co, Mn, Ni or Cu, more preferably M is at least one of Fe, Co or Mn and more preferably 0.1≤x≤0.5. In an embodiment, 0.1≤x≤0.4. In an embodiment, 0.2<x<0.5. In an embodiment, 0.1<x<0.3. In an embodiment, M is Mn. In an embodiment, M is Fe. In an embodiment, M is Co. In an embodiment, M is Ni. In an embodiment, M is Cu. In an embodiment, M is a combination of Mn and Co. In an embodiment, M is a combination of Mn and Fe.

$Na_2O.5Al_2O_3$ represents the spinel β″ alumina crystal lattice. The electroactive material shown above is β″ alumina where a fraction of the aluminum sites are replaced by at least one of the transition metal redox species. Upon electrochemical discharge sodium ions mediate into close proximity to the reduced transition metal within the crystal lattice to achieve electroneutrality. The reverse occurs upon charge.

Transition metal substituted NASICON based materials having formula:

$$Na_3M_2(XO_4)_3,$$

where X is P, Si, S, Mo or As; and M is at least one transition metal. Exemplary transition metals are Fe, Ti, V, Nb, or Cr. In specific embodiments, X is P. Exemplary materials are $Na_2TiFe(PO_4)_3$ and $Na_3V_2(PO_4)_3$.

$$NaMPO_4,$$

where M is at least one of Mn, Fe, Co or Ni. In an embodiment, M is Mn. In an embodiment, M is a combination of Mn and Fe. In an embodiment, M is a combination of Mn and Co. In embodiments, the material has an olivine structure.

Olivine phases of these materials have been indicated to be of interest in cathodes for sodium ion batteries. Lee, K. T. et al. (2011) Chem. Mater. 23:3593-3600. This reference is incorporated by reference herein in its entirety for descriptions of these materials, methods of making these materials and applications to sodium ion batteries.

$$NaMnO_2, \text{ either } \alpha\text{-}NaMnO_2 \text{ or } \beta\text{-}NaMnO_2;$$

These materials have been reported to be useful as cathode materials in sodium ion batteries. See: Ma, X. et al. (2011) J. Electrochemical Society, 158:A11307-A1312 and Billaud et al. (2014) J. Amer. Chem. Soc. 136(49): 17243-17248. Each of these references is incorporated by reference herein in its entirety for descriptions of how to make the subject material and applications in sodium ion batteries.

$$NaMn_2O_4,$$

Certain forms of this material, particularly nanocrystalline $NaMn_2O_4$, have been reported as useful as cathodes in sodium ion batteries. See: Datta et al. (2014) Materials Science and Engineering B, 188:1-7. This reference is incorporated by reference herein in its entirety for descriptions of these materials, methods of making these materials and applications to sodium ion batteries. A post-spinel compound $NaMn_2O_4$ has been reported as useful as a rechargeable battery cathode. See: Ling C. and Mizuno F. (2013) Chem. Mater. 25:3062-3071. This reference is incorporated by reference herein in its entirety for descriptions of these materials, methods of making these materials and applications to sodium ion batteries.

$$LiMnO_2, LiMn_2O_4 \text{ or } LiFePO_4 \text{ (olivine).}$$

These are lithium containing metal oxides which can intercalate sodium ions.

These sodium ion intercalating metal oxides above reversible intercalate sodium ion. The term intercalate refers generally to insertion of sodium ions in the listed material. Insertion includes insertion into layers, pores or the like within the material. Intercalation is at least in part reversible. It will be appreciated that some level of non-reversibility of intercalation of sodium ions will be tolerated without loss of functionality of the material in a cathode of a cell. The capacity for sodium intercalation and the extent of reversibility of intercalation depends at least in part on of the structural type of the phase of the metal oxide. The capacity for sodium intercalation and the extent of reversibility of intercalation can also depend at least in part on of the size of particle of the material employed. In preferred embodiments, the intercalating metal oxides are nano-sized, where nano-sized meaning having an average particle size up to 3,000 nm or more preferably having particle size up to 1,000 nm. In embodiments, the average particle size of the intercalating metal oxides ranges from 1 to 1,000 nm. In embodiments, the average particle size of the intercalating metal oxides ranges from 1 to 500 nm. In embodiments, the average particle size of the intercalating metal oxides ranges from 10 to 300 nm. In embodiments, the average particle size of the intercalating metal oxides ranges from 10 to 100 nm. In embodiments, the average particle size of the intercalating metal oxides is less than 100 nm. In embodiments, the average particle size of the intercalating metal oxides ranges from 10 to 50 nm. In embodiments, the average particle size is less than 50 nm. In embodiments, the average particle size is less than 30 nm.

Different sodium ion intercalation sites are available depending on the stacking of the oxygen layers. In specific embodiments, intercalating metal oxides have a trigonal prismatic P2 phase. See Bucher et al. 2013 and Caballero et al. 2002. In specific embodiments, intercalation metal oxides have an octahedral O3 phase. The sodium intercalating metal oxide may in an embodiment further contain a metal, such as aluminum, which is not electroactive under the operating conditions of the cell, such as materials which are descried in U.S. published patent applications US2015/0093644 (published Apr. 2, 2015) and US2015/0111097 (published Apr. 23, 2015) which are incorporated by reference here for this description.

Xu et al. (2013) Funct. Mat. Letters 6(1) 1330001 (7 pages) provides a recent review of sodium ion intercalating materials. This reference is incorporated by reference herein in its entirety for descriptions of such materials and additional methods for making such materials.

In an embodiment, the cathode material of the invention contains at most trace amounts of Sb or As. In specific embodiments, the cathode material of the invention contains at most trace amounts of Bi. In specific embodiments, the cathode material of the invention does not contain Sb, As or Bi. In specific embodiments, the active cathode material of the invention contains at most 5% by weight of Se, Te or any combination thereof. In specific embodiments, the electroactive cathode material of the invention contains at most 0.1% by weight of Se, Te or any combination thereof. In specific embodiments, the electroactive cathode material of the invention contains at most 0.1% by weight of Se, Te or any combination thereof. In specific embodiments, the electroactive cathode material of the invention contains at most 0.01% by weight of Se, Te or any combination thereof. In specific embodiments, the electroactive cathode material of the invention contains at most 0.001% by weight of Se, Te or any combination thereof.

In specific embodiments, the electroactive cathode material of the invention does not contain Se or Te. In specific embodiments, the cathode material contains less than 0.01 wt % of Zn. In specific embodiments, the cathode material contains less than 0.001 wt % Zn. In specific embodiments, the cathode material contains less than 0.01 wt % of Ni. In specific embodiments, the cathode material contains less than 0.001 wt % Ni. In specific embodiments, the cathode material contains less than 0.01 wt % of V. In specific embodiments, the cathode material contains less than 0.001 wt % V. In specific embodiments, the cathode material contains less than 0.01 wt % of any transition metal other than Mn. In specific embodiments, the cathode material contains less than 0.001 wt % of any transition metal other than Mn. In specific embodiments, the cathode material contains less than 0.001 wt % of any transition metal other than Fe.

In an embodiment, the electrolyte does not contain organic solvent, such as propylene carbonate. In an embodiment, the cathode does not contain an organic binder, such as a polymeric material, for example, a fluoropolymer, such as polyvinylidene fluoride or polytetrafluoroethylene.

In an embodiment, the cathode electroactive material does not contain silicon. In an embodiment, the cathode electroactive material does not contain silica. In an embodiment, the cathode electroactive material does not contain a phyllosilicate. In an embodiment, the cathode electroactive material does not contain an aluminum phyllosilicate. In an embodiment, the cathode electroactive material does not contain a sodium phyllosilicate. In an embodiment, the electroactive material is other than a clay and more specifically is other than bentonite or montmoillonite.

The positive electrode materials comprise the sodium intercalating metal oxide, sodium haloaluminate, and optionally a dispersed conductive material, such as carbon.

In an embodiment, the cathode components are combined in the cathode compartment of the cell. The method of combination and introduction of the cathode materials into the cathode compartment of the cell is not particularly limited. The cathode can be made in various ways. For example, the intercalation metal oxide can be mixed with all or a portion of the solid sodium haloaluminate catholyte, introduced into the cathode compartment and heated to melt the catholyte. Alternatively, a selected amount of intercalation metal oxide can be added to a selected amount of already molten sodium haloaluminate. Alternatively, multiply portions of the intercalation metal oxide can be added to a portion of the catholyte and after addition, the amount of catholyte can be adjusted.

As noted above, in specific embodiment, a combination of solid cathode components are mixed, optionally shaped, optionally introduced into a receptacle and optionally provided with an embedded current collector. The receptacle containing the combination is introduced into the cathode compartment and additional catholyte can thereafter be added to the cathode. In an embodiment, the weight ratio of sodium intercalating metal oxide to sodium haloaluminate in such solid combinations ranges from 0.2 to 5 and more specifically from 0.5 to 2.

The cathode combinations can optionally also contain relatively low levels 10 wt % or less (more specifically 5 wt % or less) of electrochemically inactive materials to facilitate mixing, processing or shaping of the combinations. Combinations optionally contain alkali metal halide salts or aluminum halide salts, particularly NaCl and/or $AlCl_3$. If present, such salts are at relatively low total levels less than 10 wt %, less than 5 wt %, or less than 1 wt %. In specific embodiments, the combinations contain NaF at a level of 10 wt % or less. In specific embodiments, the combinations do not contain NaF. In specific embodiments, the combinations do not contain any sulfur-containing compound. In specific embodiments, the combinations do not contain a transition metal or alkali metal sulfide.

The cell of the invention contains molten catholyte in addition to that which permeates the intercalating metal oxide of the positive electrode. In general the amount of catholyte in the cell relative to electroactive component is such that the cell capacity is not limited by the catholyte. A useful molar ratio of alkali metal haloaluminate to electroactive components is 2 or higher. The relative amounts of positive electroactive material to catholyte can be readily adjusted to avoid limitation of cell capacity.

The preferred catholyte of the invention is a sodium haloaluminate. The sodium haloaluminate is preferably a sodium chloroaluminate. In embodiments, the catholyte is a sodium chloro tetraaluminate, and particularly is $NaAlCl_4$. In embodiments, the molar ratio of sodium to aluminum in the catholyte ranges from 0.8 to 1.2. In embodiments, the molar ratio of sodium to aluminum in the electrolyte ranges from 0.9 to 1.1. In embodiments, the molar ratio of sodium to aluminum in the electrolyte ranges from 0.95 to 1.05. In an embodiment, the molar ratio of sodium to aluminum is about 1. Sodium salts as described in US patent application 2015/047619 can also be employed in the cells and batteries of the invention. This application is incorporated by reference herein for this description. It will be appreciated that operating temperature range may be adjusted for use of such other salts in the molten state.

In an embodiment, a matrix is formed by methods described herein in the cathode of the cell. The matrix is believed to be a porous solid matrix of the intercalating metal oxide homogenously permeated with liquid catholyte. The term matrix as used herein is not intended to encompass a dispersion on or coating of a substrate with the intercalation metal oxide. The catholyte-permeated positive electrode matrix is electrically and/ionically conductive. The structure of the matrix will at least in part depend upon the amount of sodium haloaluminate combined with the other positive electrode components.

The term "matrix" is used to describe an optional component of the storage cells herein. This term does not herein imply any particular structure or shape. Nor does the term imply any particular structure of channels or pores within the matrix. In specific embodiments, the positive electrode matrix is prepared by methods as described herein by combining solid cathode components flowed by heating to form an catholyte permeated matrix.

The term "dense" refers to a component, element or layer that exhibits no through porosity. Dense components, elements or layers of this invention exhibit ion conductivity or both ion and electron conductivity. In such dense components, transport across the membrane occurs through the lattice structure and channels in the material rather than through pores. Dense ion-conductive components, elements or layers can function as separators allowing selective passage or transport of a selected ionic species (e.g., a particular alkali metal cation, e.g., sodium cation), but not allowing direct transport of neutral species or other ions. It will be appreciated that some low level of direct transport of neutral species and/or other ions may be accommodated in the dense components, elements or layers herein without loss of function. It will be appreciated in the art, that the ion conductivity of materials used in the invention can vary with material composition, temperature, and thickness through which ions and electrons are transported.

The optional matrix component of this invention which is permeated with liquid catholyte contains some level of pores through the matrix (i.e. is porous). The matrix preferably however retains sufficient mechanical strength at operating conditions to avoid unreasonable cracking or other breakdown. In specific embodiments, the pore volume of the matrix ranges from 5 to 35% and in more specific embodiments, the pore volume ranges from 5 to 25%.

In specific embodiments, sodium cation-conductive β"-alumina is useful as a dense sodium cation-conductive material. The crystalline structure of sodium cation-conductive β" alumina, which possesses the general composition $NaAl_5O_8$, is a rhombohedral spinel with an R3m space group with lattice constants of 'a'=5.614 and 'c'=33.85 A respectively.

Various alkali metal conductive (including sodium-conductive) materials are known in the art.

Additional examples of alkali metal-conductive materials include, among others: a material having the formula $A_{1+x}Zr_2Si_xP_{3-x}O_{12}$ where $0.1 \leq x \leq 3$, where A is Na, K, or Li; a material having the formula $Na_{1+x}Zr_2Si_xP_{3-x}O_{12}$ where $0.1 \leq x \leq 3$; a material having the formula $A_5BSi_4O_{12}$ where A is Na, K, or Li, and B is Y, Nd, Dy, or Sm, or mixtures thereof; a non-stoichiometric alkali-deficient material having the formula $(A_5BSi_4O_{12})_{1-\delta}(B_2O_3.2SiO_2)_\delta$, where A is Na, K, or Li, and B is Nd, Dy, or Sm, or mixtures thereof and where δ is the measure of deviation from stoichiometry; a material with the formula $Li_{1+x}Al_xTi_{2-x}(PO_4)_3$ or $Li_{1.3}Al_{0.3}Ti_{1.7}(PO_4)_3$. Alternatively, the alkali metal conducting material can be a layered alkali ion conducting ceramic-polymer composite membrane, having alkali ion-selective polymers layered on alkali ion conducting ceramic solid electrolyte materials. Alternatively, the alkali metal-conducting material is a NaSICON, KSICON or LiSICON membrane available from Ceramatec, Inc (Salt Lake City, Utah). Other types of alkali-ion conductive substantially non-porous separators may also be used in the invention. U.S. Pat. No. 8,343,661 provides additional description of alkali-metal conducting materials useful as separators in the cells of this invention. This patent is incorporated by reference herein for this description.

An electronic conductor is optionally added to the cathode material. The type of electronically conductive material used is not particularly limited and in general any such materials typically used in cells and batteries can be employed. A carbon material can be employed, for example, carbon black, active carbon, acetylene black, graphite fine particles or mixtures may be used. Carbon fiber or other electroncially conducting fibers may be used. Corrosion-resistive metal such as titanium or gold, carbides such as SiC or WC, or nitrides such as $Si_3N_4$ or BN may be used.

The cell and batteries of the invention employ a molten sodium negative electrode. The electrode can comprise sodium or a mixture of alkali metals and alkaline earth metals thereof wherein sodium is the predominate component of the mixture. It is preferred to minimize the presence of alkaline earth metals or alkali metals other than sodium. Various types of molten alkali metal electrodes are known in the art. U.S. Pat. No. 8,343,661 provides additional description of molten sodium electrodes useful in the cells of this invention, including additives which can affect electrode performance. This patent is incorporated by reference herein for this description.

The amount of sodium added to a cell is such that the capacity of the molten sodium electrode should be about 20% greater than that of the cathode such that the cell is cathode limited and that the effective reservoir of the sodium chloroaluminate catholyte between the cathode and solid electrolyte should be sufficient to directly react with sodium in the anode in the case of cell rupture to avoid reaction of liquid alkali metal with electroactive material (e.g., intercalating metal oxide) in the positive electrode.

In an embodiment, the invention provides a storage cell comprising:
a negative electrode comprising molten sodium metal;
a positive electrode having solid sodium intercalating metal oxide;
a molten sodium haloaluminate catholyte; and
a solid sodium conducting separation element intermediate between the negative electrode and the molten sodium haloaluminate catholyte;
wherein the molten sodium haloaluminate catholyte permeates the solid metal oxide of the positive electrode.

More specifically, in the storage cell the intercalating metal oxide is retained in the cell cathode in a conductive container or receptacle.

In any cell embodiment herein, the electrolyte can be sodium chloroaluminate.

In any cell embodiment herein, the electrolyte can be $NaAlCl_4$.

In any cell embodiment herein, the positive electrode can further comprise a dispersed electronically conductive material. In any cell embodiment herein, the electronically conductive material can contain carbon. In any cell embodiment herein, the electronically conductive material can be a form of carbon. In any cell embodiment herein, the electronically conductive material can contain non-graphitic carbon. In any cell embodiment herein, the electronically conductive material can be carbon black.

In any cell embodiment herein, the sodium intercalating metal oxide can be $Na_xMO_2$, where $0.25<x \leq 0.7$ and M is at least one of Fe, Co, Mn, Ni, Cu. In any cell embodiment herein, the sodium intercalating metal oxide can be $Na_xMO_2$, where $0.25<x \leq 0.7$ and M is Mn, Co or a combination of Mn and Co. In any cell embodiment herein, the sodium intercalating metal oxide can be $Na_xMO_2$, where $0.25<x \leq 0.7$ and M is Mn. In any cell embodiment herein, the sodium intercalating metal oxide can be $Na_xMO_2$, where $0.4 \leq x \leq 0.7$ and M is Mn, Co or a combination of Mn and Co. In any cell embodiment herein, the sodium intercalating metal oxide can be $Na_xMO_2$, where $0.4 \leq x \leq 0.7$ and M is Mn.

In any cell embodiment herein, the sodium intercalating metal oxide can be $\gamma\text{-}Fe_2O_3$ or $\alpha\text{-}Fe_2O_3$. In any cell embodiment herein, the sodium intercalating metal oxide can be $\gamma\text{-}Fe_2O_3$. In any cell embodiment herein, the sodium intercalating metal oxide can be $\alpha\text{-}Fe_2O_3$.

In any cell embodiment herein, the sodium intercalating metal oxide can be $Na_2O.5M_xAl_{2-x}O_3$, where: $0<x \leq 0.5$ and M is at least one of Fe, Co, Mn, Ni or Cu. In any cell embodiment herein, the sodium intercalating metal oxide can be $Na_2O.5M_xAl_{2-x}O_3$, where: $0<x \leq 0.5$ and M is at least one of Fe, Co or Mn. In any cell embodiment herein, the sodium intercalating metal oxide can be $Na_2O.5M_xAl_{2-x}O_3$, where: $0.1 \leq x \leq 0.2$ and M is at least one of Fe, Co, Mn, Ni or Cu.

In any cell embodiment herein, the sodium intercalating metal oxide can be $Na_3M_2(XO_4)_3$, where: X is P, Si, S, Mo or As; and M is at least one transition metal. In any cell embodiment herein, the sodium intercalating metal oxide can be $Na_3M_2(XO_4)_3$, where: X is P, Si, S, Mo or As; and M is at least one of Fe, Ti, V, Nb, or Cr. In any cell embodiment herein, the sodium intercalating metal oxide can be $Na_3M_2(XO_4)_3$, where: X is P. In any cell embodiment herein, the sodium intercalating metal oxide can be $Na_3M_2(XO_4)_3$, where: X is P and M is at least one of Fe, Ti, V, Nb, or Cr. In any cell embodiment herein, the sodium intercalating metal oxide can be $Na_2TiFe(PO_4)_3$ or $Na_3V_2(PO_4)_3$.

In any cell embodiment herein, the sodium intercalating metal oxide can be $NaMPO_4$, where M is at least one of Mn, Fe, Co or Ni. In any cell embodiment herein, the sodium intercalating metal oxide can be NaMPO$_4$, wherein M is Mn.

In any cell embodiment herein, the sodium intercalating metal oxide can be NaMnO$_2$. In any cell embodiment herein, the sodium intercalating metal oxide can be α-NaMnO$_2$. In any cell embodiment herein, the sodium intercalating metal oxide can be β-NaMnO$_2$.

In any cell embodiment herein, the sodium intercalating metal oxide can be NaMn$_2$O$_4$.

In any cell embodiment herein, the sodium intercalating metal oxide can be LiMnO$_2$, LiMn$_2$O$_4$ or LiFePO$_4$.

The invention provides a battery comprising a plurality of cells of any one or more embodiments of storage cells herein. The invention provides a rechargeable battery comprising a plurality of cells of any one or more embodiments of storage cells herein.

The invention provides a method for generating energy, comprising forming one or more cells of any cell embodiment herein and discharging the one or more cells as is known in the art. The invention provides a method for generating energy comprising forming one or more cells of any cell embodiment herein and discharging the one or more cells and further comprising a step of storing electrical energy wherein the one or more cells are rechargeable and wherein after discharge the one or more cells are recharged by application of a voltage to the cell.

The invention provides a method for storing energy, comprising forming one or more cells of any cell embodiment herein and charging the one or more cells.

The cells and batteries of this invention operate over the temperature range 150-320° C., more specifically operate over the temperature range of 200 to 300° C. and yet more specifically at temperatures of and between 250 to 300° C. In specific embodiments, the cells and batteries of this invention operate at 275° C.±10%. In specific embodiments, the cells and batteries of this invention operate at 275° C.±5%. It will be understood that the operating temperature of a cell or battery can be affected by the selection of sodium salt catholyte. The catholyte is molten at operating temperatures. Catholyte materials suitable for use in the invention may have melting temperatures lower than the melting temperature of NaAlCl$_4$, thus the operating temperature of a cell may change if alternatives of NaAlCl$_4$ are employed in the cell. Methods and devices for controlling the operation temperature of cells and batteries are known in the art and can be applied by one of ordinary skill in the art in the practice of this invention.

Theoretical energy densities for the cells of this invention would be in the range 300-500 Wh/Kg.

The present invention is directed to sodium batteries which employ molten sodium metal and are operated at temperatures above the melting point of sodium, i.e. greater than about 100° C. The invention is not directed to sodium ion batteries which are operated at about room temperature at least less than 50° C., (e.g., 25° C.) and which employ negative electrodes which are solid sodium metal (e.g., foil) or which employ a negative electrode which intercalates sodium ions (Na+). Exemplary sodium ion intercalating negative electrodes include porous carbons. Ellis B. and Nazar, L. (2012) Current Opinion in Solid State Material Science 16:168-177 is a recent review of sodium and sodium ion batteries which describes the differences between molten sodium batteries and sodium ion batteries. This reference is incorporated by reference herein in its entirety for descriptions of molten sodium negative electrodes (anodes).

Figure 8:
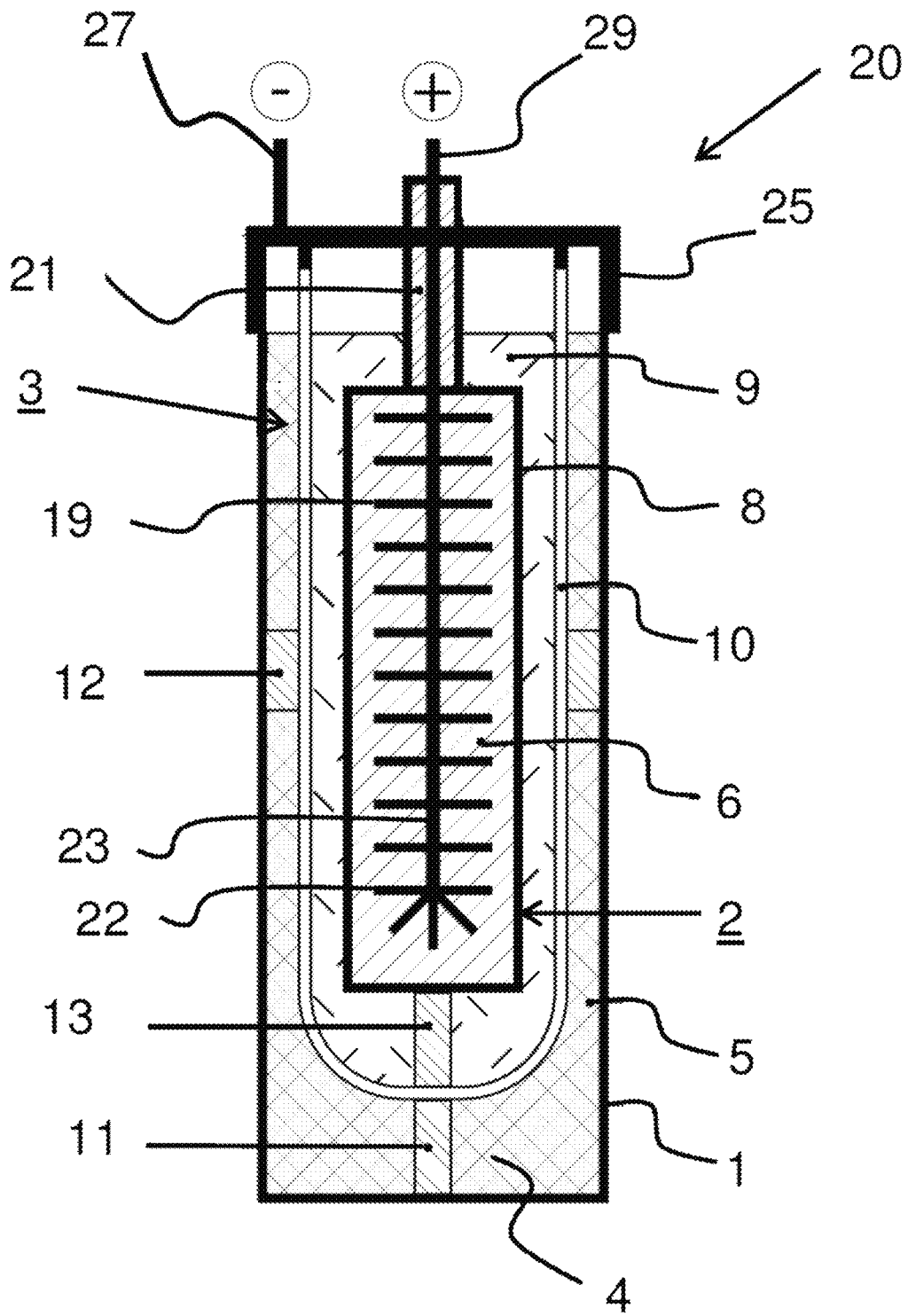
FIG. 8 is a schematic illustration of an energy storage cell.

A schematic illustration of an energy storage cell 20 of this invention is provided in FIG. 8. An exemplary cell (20) comprises a positive electrode (2) and a negative electrode (3) formed within an appropriate conductive housing (battery case) 1 and the electrodes are separated by a dense sodium-conducting separator 10 which functions as a solid electrolyte. The negative electrode is formed of sodium (4) which is liquid (molten) at cell operating temperatures. The sodium is contained within a negative electrode compartment formed between the housing (1) inner wall and separator 10. The positive electrode compartment optionally contains an electrical conductor (5), which may be a porous material, such as a carbon felt, to improve electrical connection between the separator (10), sodium (4), the housing (1), cap (25) and negative cell terminal (27).

The positive electrode (2) comprises a solid sodium intercalating metal oxide as the positive electroactive material electrically connected via a current collector (e.g., 19) to the cell negative terminal (29). Electrical connection to the negative terminal can be via a feed through (21) in housing cap (25). The solid which may in the form of a matrix (6) is preferably formed within an electrically conductive mesh (8) which substantially retains the positive electroactive material. A reservoir of sodium haloaluminate which is liquid (molten) at cell operating temperatures (9) functions as a molten catholyte between separator (10) and the positive electrode (2). The cell embodiment of FIG. 8 is specifically illustrated with a tubular cell geometry where a tube formed of dense sodium-conductive electrolyte (separator 10) also serves to contain the positive electrode material within positive electrode (2) and the molten sodium salt electrolyte (9).

In the illustrated tubular cell embodiment of FIG. 8, the separator tube (10) is inserted into the cell housing (1) and supported and positioned therein with one or more supports (11, 12). The separator tube (10) is positioned within the housing and spaced away from the inner wall of the housing to form a negative electrode compartment surrounding the separator tube for receiving alkali metal (4). The separator tube (10) may be positioned symmetrically within housing (1). In this embodiment, the positive electrode (2) is supported and positioned within the separator tube (10) and spaced away from the inner wall of the separator tube employing one or more supports (13) forming a positive electrode compartment for receiving liquid electrolyte (6).

In a specific embodiment, current collection from the positive electrode (2) is accomplished using a conductive element (19) embedded into the matrix of the positive electrode. The conductive element may be in the form of a wire or ribbon. In a preferred embodiment, the conductive element extends throughout the porous matrix. In a specific embodiment, as illustrated in FIG. 8, the conductive element is in the form of a conductive brush with a plurality of brush elements (22) extending from a conductive stem (23). The positive electrode matrix can contain a dispersed electrically conductive material, such as carbon.

Suitable current collectors include, among others, a metal, such as nickel, aluminum, titanium, copper, gold, silver, platinum, aluminum or an alloy thereof or stainless steel; plasma sprayed or arc sprayed carbon material, an active carbon fiber, The shape of the collector is not particularly limited. The current collector may be a wire, a coil, a thin film, a flat plane, a mesh, a net, a brush, a punched or an embossed element, or a combination thereof. The receptacle for containing solid metal oxide in the cathode compartment noted above can function as a current collector.

Battery cells of the invention can be prepared by known methods including those described in the examples herein.

The exemplified method prepares cell in the charged state employing liquid sodium. It will be appreciated by those of ordinary skill in the art that cells can be made in the discharged state avoiding the direct use of molten sodium. This would be achieved using fully sodium ion intercalated cathodes and the use of a porous matrix in intimate contact between the β" alumina (on the anode side) and the negative electrode current collector (e.g., mild steel). The porous matrix could, for example, consist of a porous carbon (not graphitized) felt or a porous metal weave (e.g., mild steel).

For example the following procedure can be employed to prepare cells in the discharged state. Cells are fabricated using a closed-one-end β"-alumina tube (5 mm i.d.). The tube is mounted in a mild steel case. The tube is positioned symmetrically within the case and spaced from the case wall employing one or more boron nitride spacers. Porous carbon felt is introduced into the steel case in contact with the inside case wall and the outside wall of the β"-alumina tube. In a specific embodiment, the case is tubular and has an i.d. of 7.5 mm.

The cylindrical discharged state cathode assembly described above is inserted into the β"-alumina tube and positioned therein using one or more boron nitride spacers. The cell assembly is then heated to 250° C. $NaAlCl_4$ is then introduced into the β"-alumina tube surrounding the cathode assembly. It is not necessary to add liquid sodium to the cell assembly. The heated cell is then initially charged by application of an external applied voltage in excess of the cells final anticipated open circuit voltage (about 2.7V). During charging, sodium ions in the cathode are reduced forming liquid sodium at the anode.

Figure 9:
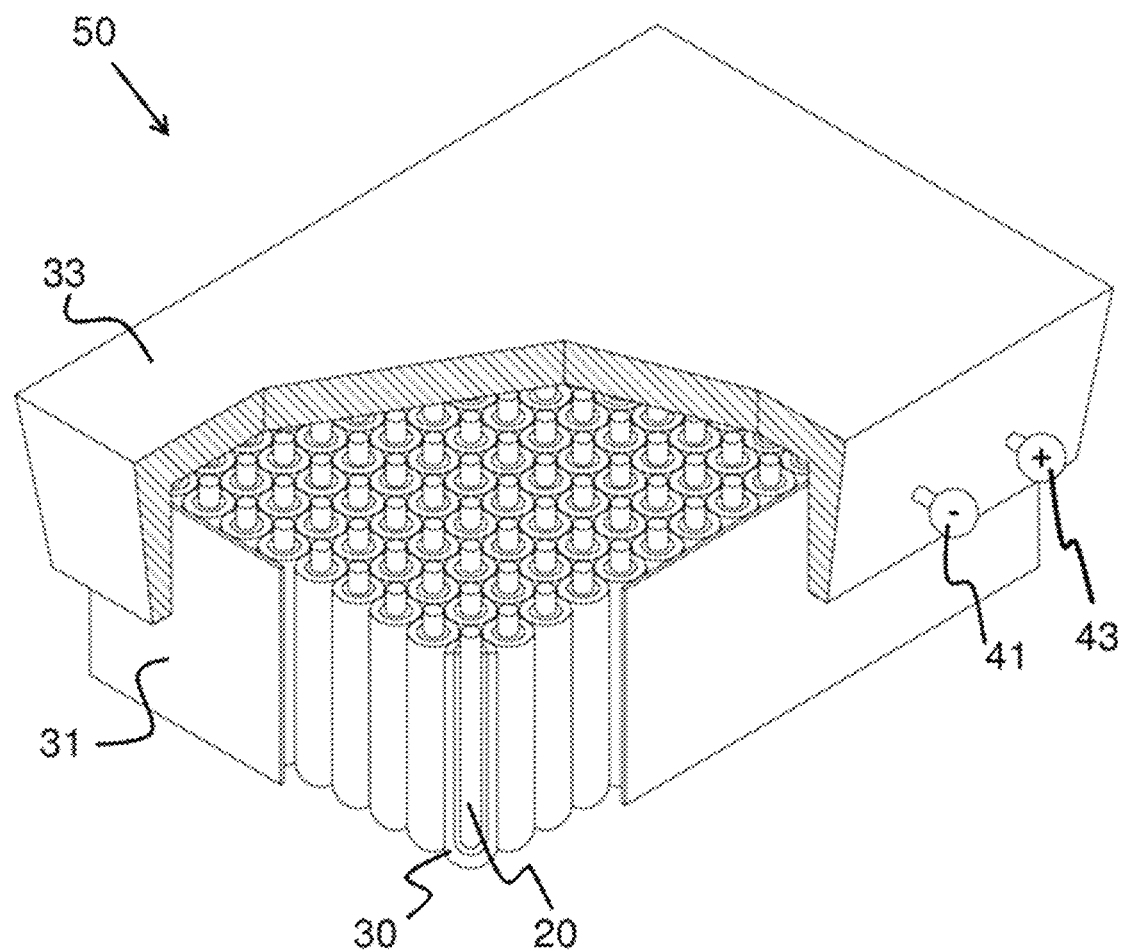
FIG. 9 is a schematic illustration of an exemplary battery.

Batteries of the invention comprise one or more storage cells of the invention, electrically connected in series or in parallel as is known in the art. FIG. 9 provides a schematic illustration of an exemplary battery (50) of the invention. The battery is illustrated as comprising a plurality of cells of the invention (20). As is understood in the art dependent upon voltage and current requirements in a given application the cells may be electrically connected in series or in parallel. Electrical connection of the cells is not shown in FIG. 9. The illustrated battery is formed within a battery housing, which can be a two part housing with a base container (31) and a cover (33). Such a battery housing can be sealed employing any appropriate art-recognized method. Alternatively, the battery housing may be unitary. Battery terminals (positive 43 and negative 41) are provided through the battery housing. These battery terminals are electrically connected to appropriate terminals of the cells within the battery.

Supports (30) are optionally provided within the battery housing for one or more of the cells therein. Such supports optionally provide thermal insulation. The battery may be cooled or heated to maintain a desired operating temperature, for example, by contact of a cooling (or warming) liquid with the cells or the housing or by introducing one or more channels into and through the housing for carrying a cooling liquid. The battery can be provided with thermal control including a temperature sensor to maintain a selected temperature. Various means for heating or cooling of the battery or cells therein can be employed.

Structural components of the cells and batteries (e.g., cases, housings, caps, spacers, containers or receptacles) of the invention are made of materials compatible with the operating temperatures of the cells and the compounds or compositions (e.g., liquid alkali metal, liquid catholyte and positive electroactive material) with which they come into contact, particularly at cell operating temperatures. Compatibility generally means that the components of the cells and batteries retain integrity and mechanical strength as needed in contact with cell compounds or compositions at cell operating temperatures for example, the components do not detrimentally react with such compounds or compositions over a reasonable cell/battery lifetime. As is known in the art, the materials of the components are preferably chosen to avoid undesired cracking or leakage, excessive corrosion, seal failure and/or undesired deposition on surfaces. For example, the cell housing can be mild steel, spacers can be ceramic, such as boron nitride. Current collectors, including both positive and negative electrode current collectors, can be made of any appropriate conductive material as is known in the art. For example, current collectors can be made of Pt, Pd, Mo, Au, Ni, Ti or carbon. Current collectors can be in any shape, e.g., wires, ribbons, foils, and the like.

The metal basket optionally used in the positive electrode is preferably made of corrosion resistant metal, particularly a corrosion resistant alloy and more particularly a corrosion resistant Ni alloy. The corrosion resistant Ni alloy may contain Mo, Fe, Cr, among other metals. The corrosion resistant alloy may be an alloy of approximate composition (Ni62/Mo28/Fe5/Cr/Mn/Si/V0.4/C0.05) which is currently designated Hastalloy B®. The corrosion resistant alloy may be an alloy of approximate composition (Ni 31.8/Mo16/Cr14.5-16.5/Fe4-7/Co2.5/V0.35/Mn/C0.08/Si/W3.75) currently generally designated Hastalloy C-276 ®. The corrosion resistant alloy may be an alloy of composition Ni50-59/Mo16-18/Cr15.5-17.5/Fe4.5-7/W3.75-5.25/V0.2-0.4/Mn/Si/P0.04/S0.03/currently designated Hastalloy C® (Haynes International, Kokomo Ind.).

Cells and batteries of this invention are useful in a variety of applications and preferably are used for electric energy storage or electric vehicle propulsion.

In specific embodiments, the cells of the invention are cells which provide particular benefit over the currently competing sodium-sulfur or sodium-nickel chloride cells. In a specific embodiment, the positive electrodes herein can replace sodium-polysulfide and nickel chloride electrodes in currently competing sodium-sulfur or sodium-nickel chloride cells. The reversible cathode of this invention, can for example, be combined with liquid sodium electrodes that are currently known in the art and specifically those that have been developed for sodium-sulfur and sodium-nickel chloride cells.

Cells and batteries of the present invention exhibit specific advantages over sodium-sulfur and sodium-nickel chloride cells and batteries. In the case of the sodium-sulfur system, the cells of this invention avoid potential explosion hazards associated with rupture of the β"-alumina solid electrolyte at battery operating temperature when unit activity liquid sodium and liquid sodium polysulfide would come directly into contact. No toxicity issues exist when using the cathode electroactive species in the system of this invention, compared to nickel chloride in the sodium-nickel chloride system. Nickel constitutes 62% of electroactive material cost in the sodium-nickel chloride system, in contrast, the positive electroactive material in the system of the invention are currently much less expensive. Furthermore, in all battery systems heat is generated as a result of internal resistance losses. In the case of ambient temperature batteries some provision must be made for thermal management, particularly when high discharge rates are used. In the system of this invention, this is not an issue since it will be able to comfortably absorb excess heat as a consequence of its operating range being between 150 and 300° C.

Electrochemical performance of cell hardware is assessed at least in part by determining the current and voltage efficiency as well as overall rates and cycle life. Cells are operated cathode limited to determine Faradaic utilization.

Performance of batteries fabricated in the fully charged state is assessed by determining:
the overall electrochemical energy conversion efficiency as a function of operating temperature between 150 and 300° C.; applied current density between 50 and 200 mA/cm2 during charge/discharge; and
the volumetric charge capacity that can be realized from the cathode, (mAh/cm3).

Discharge curves under constant current loads are measured at various practical C (drain rates) as a function of operating temperature.

Additionally, cells are subjected to extended charge/discharge cycling tests to identify evidence of degradation by cell components as a function of time. Again, this assessment is performed at nominal current densities between 50 and 200 mA/cm2.

Batteries of the invention preferably can be operated for at least 100 charge/discharge cycles under constant current load without significant capacity fade.

All references cited herein are hereby incorporated by reference to the extent not inconsistent with the disclosure herewith.

Although the description herein contains many specifics, these should not be construed as limiting the scope of the invention but as merely providing illustrations of some of the presently preferred embodiments of the invention. Thus, the scope of the invention should be determined by the appended claims and their equivalents, rather than by the examples given.

When a Markush group or other grouping is used herein, all individual members of the group and all combinations and sub-combinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and synthetic methods, other than those specifically exemplified can be employed in the practice of the invention without resort to undue experimentation. All art-known functional equivalents, of any such methods, device elements, starting materials, and synthetic methods, are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing,", "composed of", or "characterized by," and is inclusive or open-ended and does not exclude additional, unrecited elements or method steps. As used herein, "consisting of" does not exclude any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general, the terms and phrases used herein have their art-recognized meaning, which can be found by reference to standard texts, journal references and contexts known to those skilled in the art. The preceding definitions are provided to clarify their specific use in the context of the invention.

The invention may be further understood by the following non-limiting examples.

THE EXAMPLES

Example 1: Preparation and Use of $LiMn_2O_4$ Cathode Materials

All components were assembled in a $N_2$-containing glove box. A mixture of 0.128 g $NaAlCl_4$ (Sigma-Aldrich), 0.255 g $LiMn_2O_4$(Sigma-Aldrich), and 0.006 g carbon black (Vulcan XC-72R, Cabot) were placed into a basket constructed from a molybdenum current collector and 304 stainless steel cloth (165×800/inch mesh).

A stainless tube (i.d. of 7.5 mm) was heated to 100° C. and 5.88 g of Na was melted in the tube. A β" alumina tube (i.d. of 5 mm) was filled with approximately 2 g of $NaAlCl_4$ and the tube was placed into the molten Na. The stainless steel basket containing the mixture of $NaAlCl_4$ and $LiMn_2O_4$ was then inserted into the β" alumina tube. After the $NaAlCl_4$ became molten, the β" alumina tube was capped with glass mica to prevent sublimation of $AlCl_3$. The cell was sealed using an o-ring and a stainless steel cap with a ceramic eyelet. A drop of Krytox XHT-BDZ grease was then placed over the ceramic eyelet.

The battery was slowly heated sequentially to 150, 200, 250, and finally 305° C. and dwelled at each ramping temperature for 30 min. The OCV (open circuit voltage) of the cell was 2.36V at 305° C.

GCPL (Galvanostatic Cycling with Potential Limitation) was performed on an Arbin SCTS at a rate of 15 mA and cycled between 2 and 3.6 V, see FIG. 1

Example 2: Preparation and Use of $\gamma Fe_2O_3$ Cathode Materials

Figure 2:
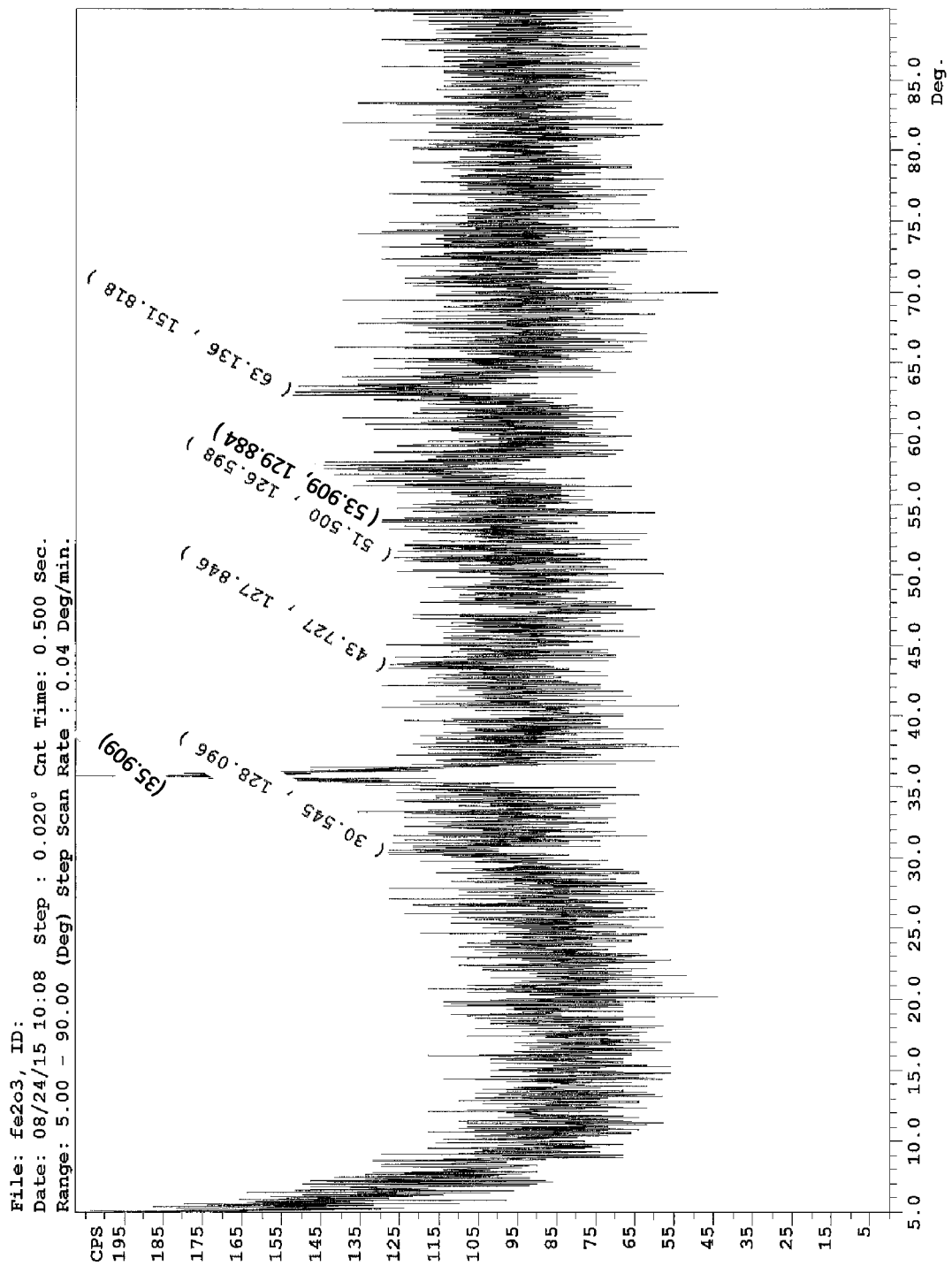
FIG. 2 is the XRD plot of γ-Fe$_2$O$_3$.

All components were assembled in a $N_2$-containing glove box. A mixture of 0.284 g NaAlCl4 (Sigma-Aldrich) and 0.255 g $\gamma Fe_2O_3$(US Research Nanomaterials, Inc.) was placed into a basket constructed from a molybdenum current collector and 304 stainless steel cloth (165×800/inch mesh). The XRD of γFe$_2$O$_3$ is provided as FIG. 2.

A stainless tube (i.d. of 7.5 mm) was heated to 100° C. and 6.5 g of Na was melted in the tube. A β" alumina tube (i.d. of 5 mm) was filled with approximately 2 g of NaAlCl$_4$ and placed into the molten Na. The stainless steel basket containing the mixture of NaAlCl$_4$ and γ-Fe$_2$O$_3$ was then inserted into the β alumina tube. After the NaAlCl$_4$ became molten, the β" alumina tube was capped with glass mica to prevent sublimation of AlCl3. The cell was sealed using an o-ring and a stainless steel cap with a ceramic eyelet. A drop of Krytox XHT-BDZ grease was then placed over the ceramic eyelet.

The battery was slowly heated sequentially to 150, 200, 250, and finally 300° C. and dwelled at each ramping temperature for 30 min. The OCV (open circuit voltage) of the cell was 3.3 V at 300° C.

Figure 3:
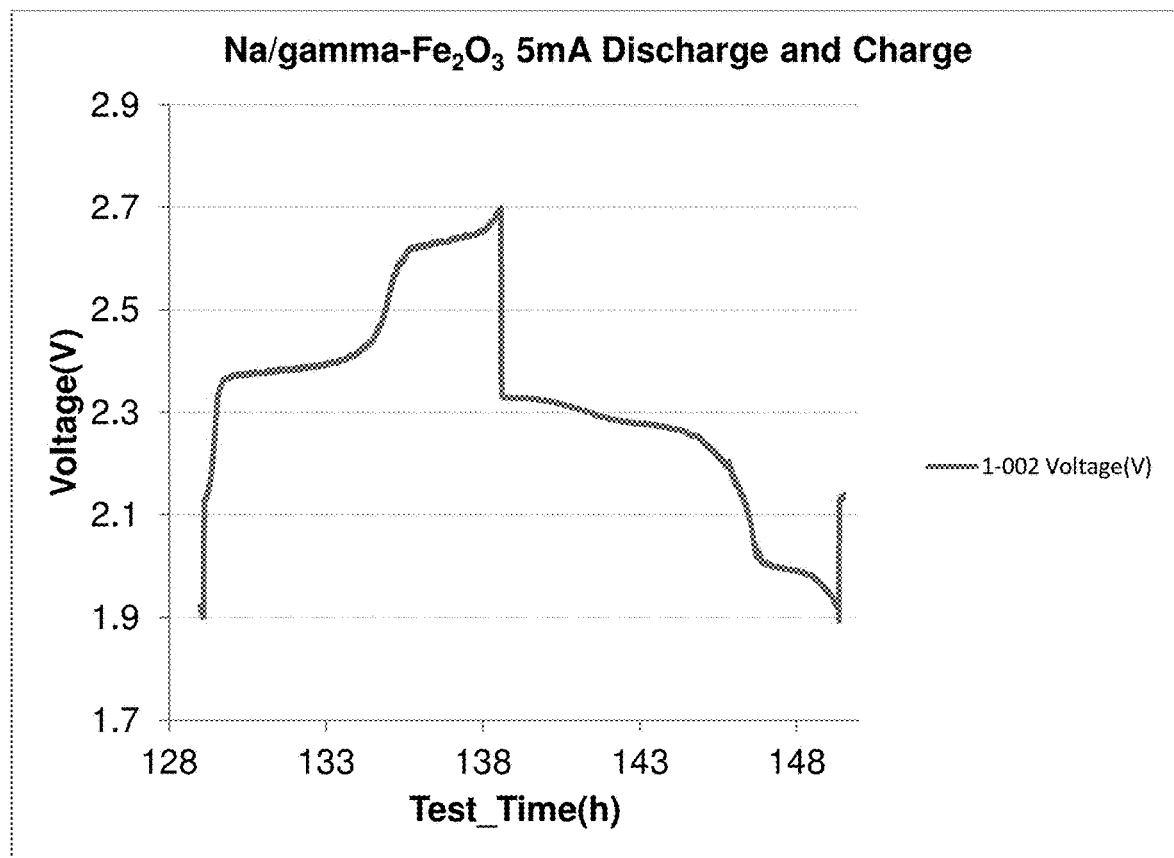
FIG. 3 is a graph of voltage vs. time illustrating GCPL performed on an Arbin SCTS at a rate of 5 mA and cycled between 1.9 and 2.7 V for a cell of Example 2 where the cathode contained γ-Fe$_2$O$_3$.

GCPL was performed on an Arbin SCTS at a rate of 5 mA and cycled between 1.9 and 2.7 V, see FIG. 3

Example 3: Preparation and Use of Na$_x$MnO$_2$ Cathode Materials

A. Na$_{0.44}$MnO$_2$

Figure 4:
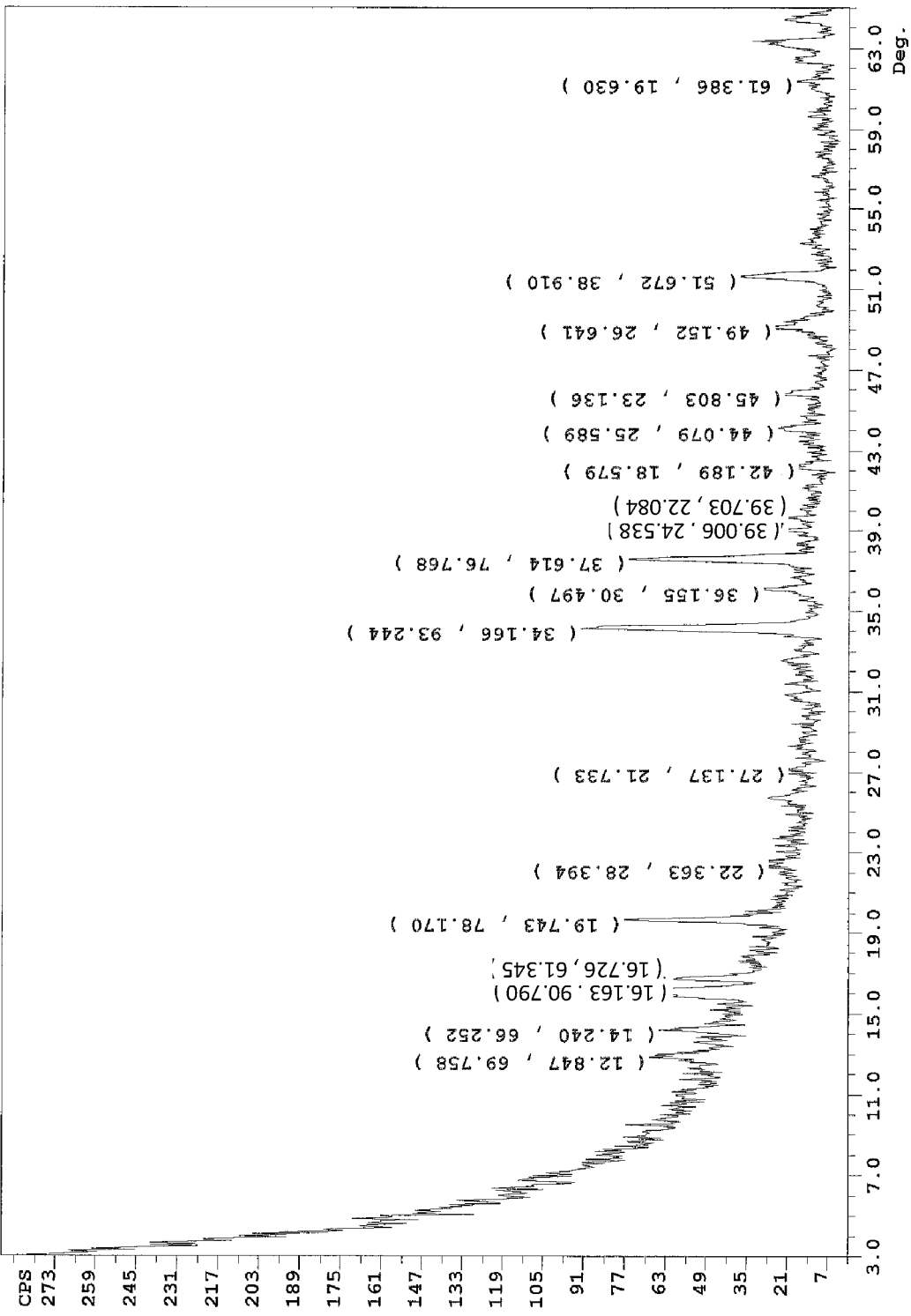
FIG. 4 is the XRD plot of Na$_{0.44}$MnO$_2$.

Na$_{0.44}$MnO$_2$ was synthesized using a reverse microemulsion method. A NaNO$_3$ solution (1M, 22 mL) and a Mn(NO$_3$)$_2$ solution (1M, 50 mL) were mixed for 30 m to form the aqueous phase of the emulsion. n-Hexane (100 mL), triton X-100 (31 g), and n-hexanol (20 g) were mixed for 30 m to make the oil phase of the emulsion. The aqueous phase was dripped into the oil phase while stirring. A light pink microemulsion formed. The mixture was heated overnight to remove solvents and the product was collected as a brown powder, which was then annealed in a furnace at 750° C. for 24 h in air. The XRD plot of this material is provided in FIG. 4

All components were assembled in a N$_2$-containing glove box. A mixture of 0.324 g NaAlCl$_4$ and 0.155 g Na$_{0.44}$ MnO$_2$ was placed into a basket constructed from a molybdenum current collector and 304 stainless steel cloth (165×800 mesh).

A stainless tube (i.d. 7.5 mm) was heated to 100° C. and 6.5 g of Na was melted in the tube. A β" alumina tube (i.d. 5 mm) was filled with approximately 2 g of NaAlCl$_4$ and placed into the molten Na. The stainless steel basket containing the mixture of NaAlCl$_4$ and Na$_{0.44}$ MnO$_2$ was then inserted into the β" alumina tube. After the NaAlCl$_4$ became molten, the β" alumina tube was capped with glass mica to prevent sublimation of AlCl$_3$.

The cell was sealed using an o-ring and a stainless steel cap with a ceramic eyelet. A drop of Krytox XHT-BDZ grease was then placed over the ceramic eyelet.

The battery was slowly heated sequentially to 150, 200, 250, and finally 300° C. and dwelled at each ramping temperature for 30 min. The OCV of the cell was 3.2 V at 300° C. The voltage dropped to 2.6 V after heating overnight.

Figure 5:
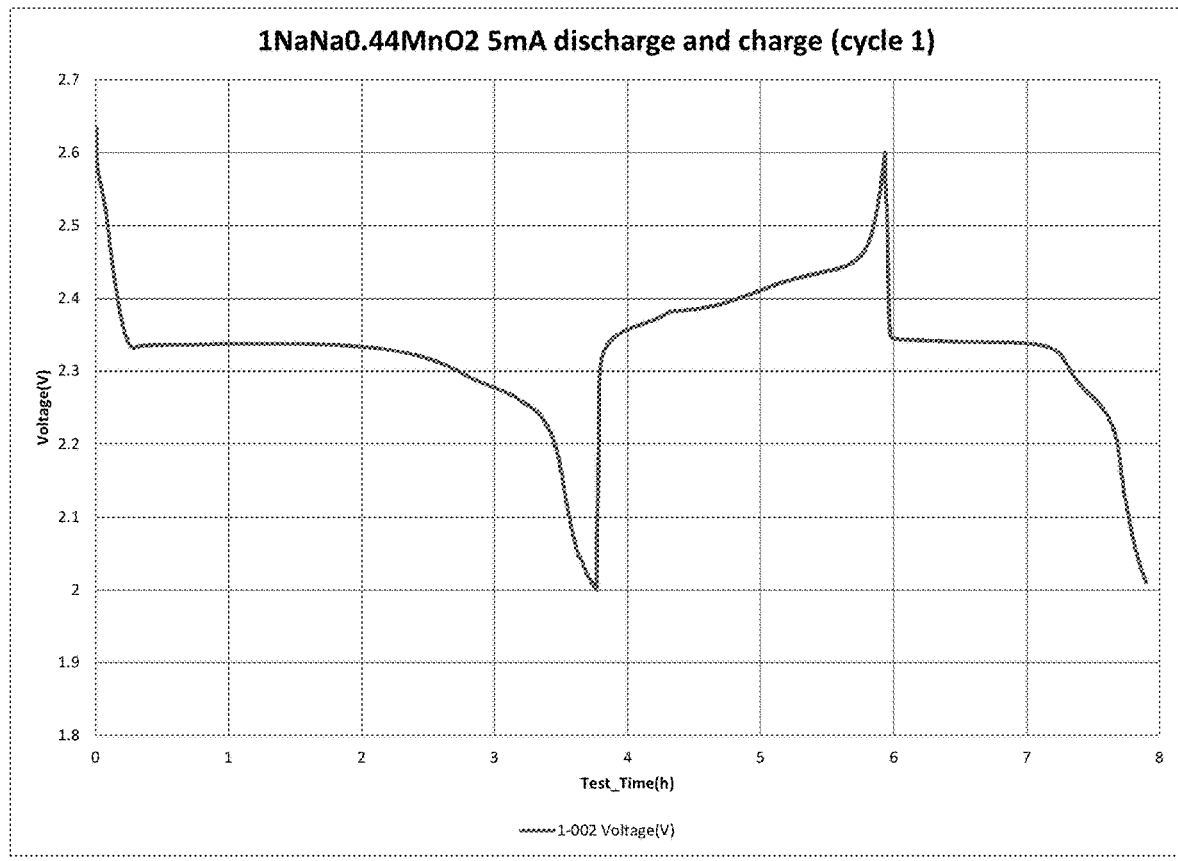
FIG. 5 is a graph of voltage vs. time illustrating GCPL performed on an Arbin SCTS at a rate of 5 mA and cycled between 2.0 and 2.6 V for a cell of Example 3 where the cathode contained Na$_{0.44}$MnO$_2$.

GCPL was performed on an Arbin SCTS at a rate of 5 mA and cycled between 2.0 and 2.6 V, see FIG. 5.

B. Na$_{0.7}$MnO$_2$

Figure 6:
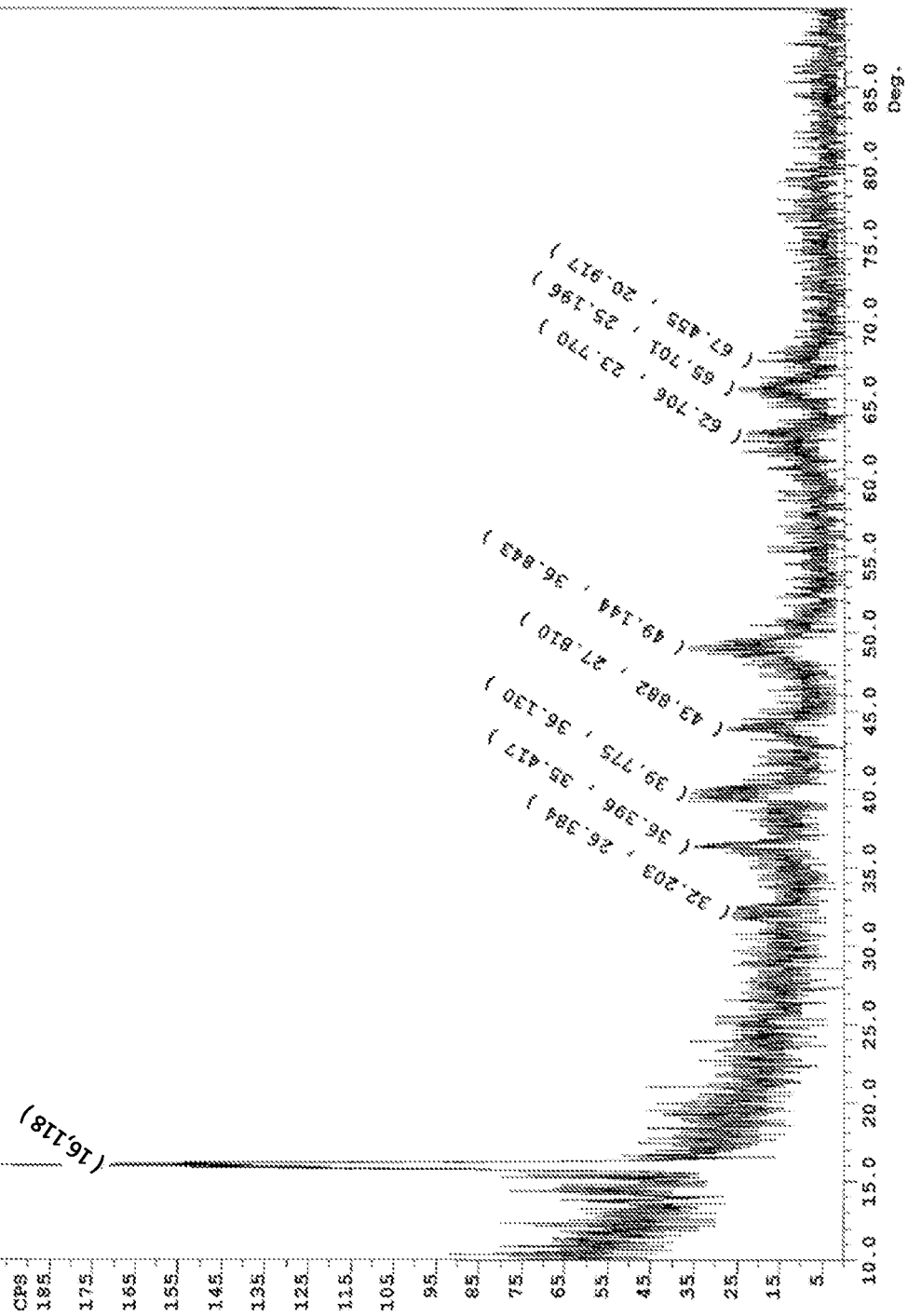
FIG. 6 is the XRD plot of Na$_{0.7}$MnO$_2$.

Na$_{0.7}$MnO$_2$ was synthesized using the combustion method in which 1.4 g of NaNO$_3$ and 4 g of Mn(II) acetate were mixed in a 7:10 molar ratio and dissolved in distilled water, followed by the addition of concentrated HNO$_3$ and 1 g of gelatin. The solution was heated and stirred until the gelatin dissolved. Further heating caused spontaneous combustion. The product was a fluffy dark brown powder, which was then annealed at 800° C. in air for 4 hours. The final product was a fluffy black powder. The XDR plot of this material is illustrated in FIG. 6.

A mixture of 0.115 g Na$_{0.7}$MnO$_2$ and 1.331 g NaAlCl$_4$ were placed into a β" alumina tube (i.d. 5 mm) with a molybdenum wire as the current collector. Na (9 g) was melted in a stainless steel container and the aforementioned β" alumina tube was inserted into the molten Na. After the NaAlCl$_4$ became molten, the β" alumina tube capped with glass mica to prevent sublimation of AlCl$_3$. The cell was sealed using an o-ring and a stainless steel cap with a ceramic eyelet. A drop of Krytox XHT-BDZ grease was then placed over the ceramic eyelet.

The battery was slowly heated sequentially to 150, 200, 250, and finally 300° C. and dwelled at each ramping temperature for 30 min. The OCV of the cell was 3.4 V at 300° C.

Figure 7:
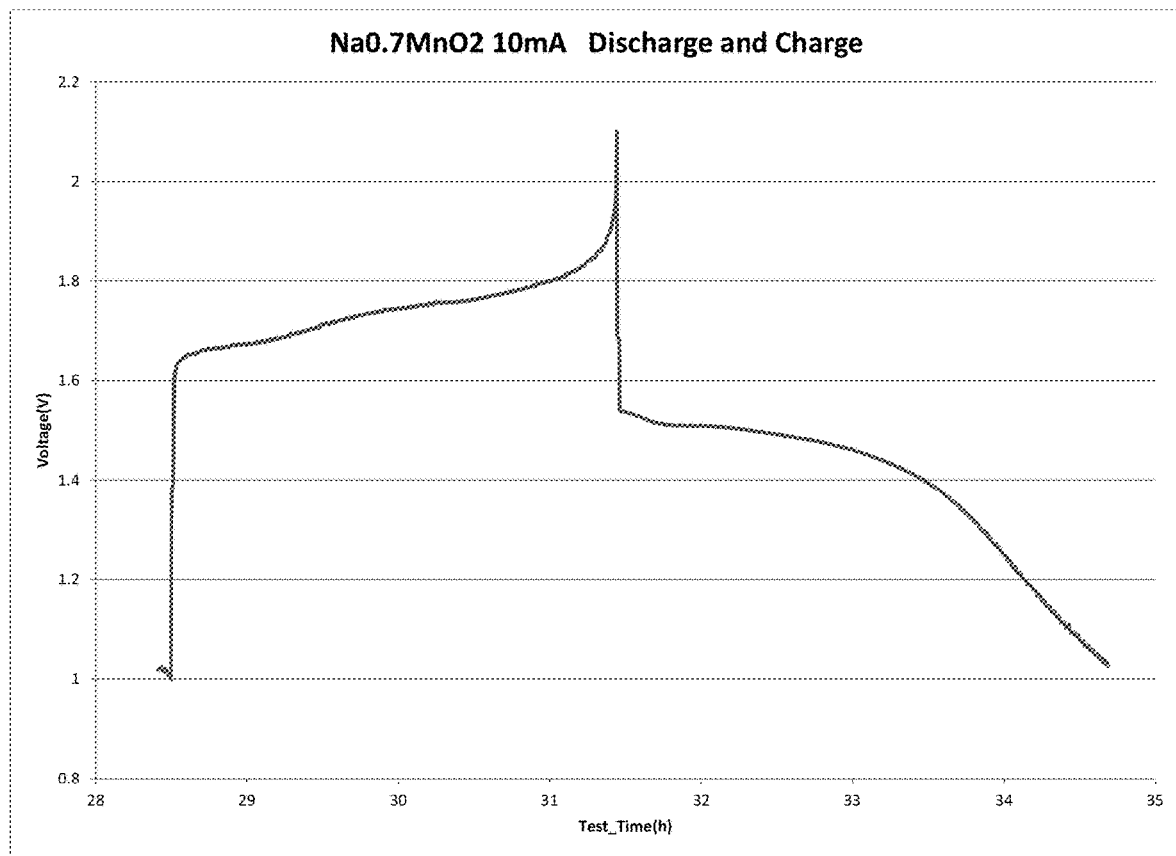
FIG. 7 is a graph of voltage vs. time illustrating GCPL performed on an Arbin SCTS at a rate of 10 mA and cycled between 1 and 2.1 V, for a cell of Example 3 where the cathode contained Na$_{0.7}$MnO$_2$.

GCPL was performed on an Arbin SCTS at a rate of 10 mA and cycled between 1 and 2.1 V, see FIG. 7.

The invention claimed is:

1. A storage cell comprising:
   a negative electrode comprising molten sodium metal;
   a positive electrode having a solid sodium-intercalating metal oxide as the active cathode material;
   a molten sodium haloaluminate catholyte; and
   a solid sodium-conducting separation element intermediate between the negative electrode and the molten sodium haloaluminate catholyte;
   wherein the molten sodium haloaluminate catholyte permeates the solid metal oxide of the positive electrode, and
   wherein the sodium intercalating metal oxide is γ-Fe$_2$O$_3$.

2. The cell of claim 1, wherein the sodium intercalating metal oxide is retained in the cell in a conductive container or receptacle, permeable to the molten catholyte, such that contact of the sodium intercalating metal oxide with the separation element is avoided.

3. The cell of claim 1, wherein the catholyte is sodium chloroaluminate.

4. The cell of claim 1, wherein the catholyte is NaAlCl$_4$.

5. The cell of claim 1, wherein the positive electrode further comprises an electronically conductive material dispersed in the positive electrode.

6. A rechargeable battery comprising a plurality of cells of claim 1.

7. A method for generating energy, comprising forming one or more cells of claim 1 and discharging the one or more cells, wherein the one or more cells is operated at a temperature ranging from 150° C. to 320° C.

8. The method of claim 7 further comprising a step of storing electrical energy wherein the one or more cells are rechargeable and wherein after discharge the one or more cells are recharged by application of a voltage to the cell.

9. A method for storing energy, comprising forming one or more cells of claim 1 and charging the one or more cells, wherein the one or more cells is operated at a temperature ranging from 150° C. to 320° C.

10. The cell of claim 2, wherein the receptacle is a metal mesh.

11. The cell of claim 5, wherein the dispersed electronically conductive material is carbon particles.

12. The cell of claim 5, wherein the dispersed electronically conductive material is selected from carbon black, active carbon, acetylene black, graphite fine particles, carbon fibers, SiC, Ti$_3$SiC$_2$, WC, Nb$_{0.1}$Ti$_{0.9}$O$_2$, TaC, TaC$_{0.75}$ and TaC$_{0.5}$.

13. The cell of claim 1 which is operated at a temperature ranging from 150° C. to 320° C.

14. The cell of claim 1 which is operated at a temperature ranging from 200° C. to 300° C.

15. The cell of claim 1, wherein the positive electrode consists of $\gamma$-$Fe_2O_3$ permeated with the molten sodium haloaluminate catholyte.

16. The cell of claim 1, wherein the positive electrode consists of $\gamma$-$Fe_2O_3$ permeated with the molten sodium haloaluminate catholyte and a dispersed electronically conductive material.

17. The cell of claim 15 which is operated at a temperature ranging from 150° C. to 320° C.

18. The cell of claim 15 which is operated at a temperature ranging from 200° C. to 300° C.

19. The method of claim 7, wherein the cell is operated at a temperature ranging from 200° C. to 300° C.

20. The method of claim 9, wherein the cell is operated at a temperature ranging from 200° C. to 300° C.

21. The cell of claim 16, wherein the dispersed electronically conductive material is carbon particles.

22. The cell of claim 16, wherein the dispersed electronically conductive material is selected from the group consisting of carbon black, active carbon, acetylene black, graphite fine particles, carbon fibers, SiC, $Ti_3SiC_2$, WC, $Nb_{0.1}Ti_{0.9}O_2$, TaC, $TaC_{0.75}$ and $TaC_{0.5}$.

23. A storage cell comprising:
   a negative electrode comprising molten sodium metal;
   a positive electrode having a solid sodium-intercalating metal oxide as the active cathode material;
   a molten sodium haloaluminate catholyte, which is sodium chloroaluminate; and
   a solid sodium-conducting separation element intermediate between the negative electrode and the molten sodium chloroaluminate;
   wherein the positive electrode consists of $\gamma$-$Fe_2O_3$ permeated with molten sodium chloroaluminate and a dispersed electronically conductive material; and
   wherein the solid sodium-conducting separation element is $\beta$"-alumina.

24. A method for generating energy, comprising forming one or more cells of claim 23 and discharging the one or more cells, wherein the one or more cells is operated at a temperature ranging from 150° C. to 320° C.

* * * * *